1

United States Patent
Smith et al.

(10) Patent No.: US 8,316,593 B2
(45) Date of Patent: Nov. 27, 2012

(54) SOLAR ROOFING SYSTEM

(75) Inventors: Jason Smith, Strongsville, OH (US); Melissa Rus, Kirtland, OH (US); Brian Lambert, Strongsville, OH (US); Joseph W. Mellott, II, Stow, OH (US)

(73) Assignee: Garland Industries, Inc., Cleveland, OH (US)

( * ) Notice: Subject to any disclaimer, the term of this patent is extended or adjusted under 35 U.S.C. 154(b) by 264 days.

(21) Appl. No.: 12/710,613

(22) Filed: Feb. 23, 2010

(65) Prior Publication Data

US 2010/0236165 A1    Sep. 23, 2010

Related U.S. Application Data

(60) Provisional application No. 61/187,415, filed on Jun. 16, 2009, provisional application No. 61/161,252, filed on Mar. 18, 2009, provisional application No. 61/184,984, filed on Jun. 8, 2009.

(51) Int. Cl.
*E04D 3/18* (2006.01)
*H02N 6/00* (2006.01)

(52) U.S. Cl. .......... 52/173.3; 52/202; 136/244; 136/251

(58) Field of Classification Search ............... 136/244, 136/245, 251, 252; 248/205.2; 52/173.2, 52/202, 173.3, 200
See application file for complete search history.

(56) References Cited

U.S. PATENT DOCUMENTS

| | | | |
|---|---|---|---|
| 3,459,597 A | 8/1969 | Baron | |
| 4,189,881 A | 2/1980 | Hawley | |
| 4,193,820 A | 3/1980 | Thomas | |
| 4,334,120 A | 6/1982 | Yamano | |
| 4,433,200 A | 2/1984 | Jester | |
| 4,485,264 A | 11/1984 | Izu | |
| 4,537,838 A | 8/1985 | Jetter | |
| 4,574,160 A | 3/1986 | Cull | |
| 4,636,577 A | 1/1987 | Peterpaul | |
| 4,636,578 A | 1/1987 | Feinberg | |
| 4,636,579 A | 1/1987 | Hanak | |
| 4,674,244 A | 6/1987 | Francovitch | |
| 4,691,076 A | 9/1987 | Levine | |
| 4,860,509 A | 8/1989 | Laaly | |
| 4,886,554 A | 12/1989 | Woodring | |
| 5,092,939 A | 3/1992 | Nath | |
| 5,164,020 A | 11/1992 | Wagner | |
| 5,232,518 A | 8/1993 | Nath | |
| 5,316,592 A | 5/1994 | Dinwoodie | |
| 5,437,735 A | 8/1995 | Younan | |
| 5,482,569 A | 1/1996 | Ihara | |

(Continued)

FOREIGN PATENT DOCUMENTS

DE    298 24045    3/2000

(Continued)

OTHER PUBLICATIONS

Lumeta PowerPly Brochure dated 2008.

(Continued)

*Primary Examiner* — Jeanette E. Chapman
(74) *Attorney, Agent, or Firm* — Fay Sharpe LLP; Brian E. Turung

(57) ABSTRACT

An apparatus and method for connecting solar panels to a roof system surface. The solar panels can be formed flexible or non-flexible solar panels that are at least partially attached to a roofing surface by use of a fastener.

20 Claims, 17 Drawing Sheets

U.S. PATENT DOCUMENTS

| | | | |
|---|---|---|---|
| 5,505,788 A | 4/1996 | Dinwoodie | |
| 5,575,861 A | 11/1996 | Younan | |
| 5,590,495 A | 1/1997 | Bressler | |
| 5,746,839 A | 5/1998 | Dinwoodie | |
| 5,830,779 A | 11/1998 | Bressler | |
| 5,968,287 A | 10/1999 | Nath | |
| 5,990,414 A | 11/1999 | Posnansky | |
| 5,998,729 A * | 12/1999 | Shiomi et al. | 136/251 |
| 6,050,042 A | 4/2000 | Durachko | |
| 6,061,978 A | 5/2000 | Dinwoodie | |
| 6,111,189 A | 8/2000 | Garvison | |
| 6,117,703 A | 9/2000 | Penndorf | |
| 6,148,570 A | 11/2000 | Dinwoodie | |
| 6,182,403 B1 | 2/2001 | Mimura | |
| 6,201,180 B1 | 3/2001 | Meyer | |
| 6,245,987 B1 | 6/2001 | Shiomi | |
| 6,268,559 B1 | 7/2001 | Yamawaki | |
| 6,295,818 B1 | 10/2001 | Ansley | |
| 6,380,477 B1 | 4/2002 | Curtin | |
| 6,384,314 B1 | 5/2002 | Lund-Hansen | |
| 6,421,966 B1 | 7/2002 | Braunstein | |
| 6,462,265 B1 | 10/2002 | Sasaoka | |
| 6,465,724 B1 | 10/2002 | Garvison | |
| 6,472,593 B1 | 10/2002 | Middelman | |
| 6,495,750 B1 | 12/2002 | Dinwoodie | |
| 6,501,013 B1 | 12/2002 | Dinwoodie | |
| 6,534,703 B2 | 3/2003 | Dinwoodie | |
| 6,553,729 B1 | 4/2003 | Nath | |
| 6,570,084 B2 | 5/2003 | Dinwoodie | |
| 6,617,507 B2 | 9/2003 | Mapes | |
| 6,670,541 B2 | 12/2003 | Nagao | |
| 6,675,580 B2 | 1/2004 | Ansley | |
| 6,729,081 B2 | 5/2004 | Nath | |
| 6,730,841 B2 | 5/2004 | Heckeroth | |
| 7,342,171 B2 | 3/2008 | Khouri | |
| 7,695,057 B2 * | 4/2010 | Autterson | 296/214 |
| 2001/0045228 A1 | 11/2001 | Takada | |
| 2001/0054262 A1 | 12/2001 | Nath | |
| 2002/0043031 A1 | 4/2002 | Eguchi | |
| 2002/0046764 A1 | 4/2002 | Ansley | |
| 2002/0078991 A1 | 6/2002 | Nagao | |
| 2002/0129849 A1 | 9/2002 | Heckeroth | |
| 2003/0070368 A1 | 4/2003 | Shingleton | |
| 2003/0094193 A1 | 5/2003 | Mapes | |
| 2003/0116185 A1 | 6/2003 | Oswald | |
| 2003/0163964 A1 | 9/2003 | Elliott | |
| 2003/0217769 A1 | 11/2003 | Okada | |
| 2004/0144043 A1 | 7/2004 | Stevenson | |
| 2005/0072456 A1 | 4/2005 | Stevenson | |
| 2005/0178428 A1 | 8/2005 | Laaly | |
| 2005/0178429 A1 | 8/2005 | McCaskill et al. | |
| 2006/0225781 A1 * | 10/2006 | Locher | 136/245 |
| 2007/0084501 A1 | 4/2007 | Kalberlah et al. | |
| 2007/0266660 A1 * | 11/2007 | Davies et al. | 52/309.1 |
| 2008/0053519 A1 | 3/2008 | Pearce et al. | |
| 2008/0233678 A1 * | 9/2008 | Takahashi et al. | 438/113 |
| 2008/0245399 A1 | 10/2008 | DeLiddo | |
| 2008/0245404 A1 | 10/2008 | DeLiddo | |
| 2008/0245409 A1 | 10/2008 | Varghese et al. | |
| 2009/0266400 A1 * | 10/2009 | Deliddo et al. | 136/244 |
| 2010/0059104 A1 * | 3/2010 | Geary | 136/251 |
| 2011/0108103 A1 * | 5/2011 | Tuma | 136/256 |

FOREIGN PATENT DOCUMENTS

| | | |
|---|---|---|
| EP | 111394 | 6/1984 |
| EP | 1191605 | 3/2002 |
| EP | 1191606 | 3/2002 |
| EP | 1588424 | 10/2005 |
| EP | 1742274 | 1/2007 |
| EP | 1856744 | 11/2007 |
| GB | 2296263 | 6/1996 |
| JP | 11-22127 | 5/1989 |
| JP | 10-102687 | 4/1998 |
| WO | WO 84/00253 | 1/1984 |
| WO | WO 2010034730 A2 * | 4/2010 |

OTHER PUBLICATIONS

Product brochure entitled: BIPV Solar Electric Roofing for Sustainable Buildings Brochure copyright 2006 Solar Integrated.

Product brochure entitled: North American BIPV copyright 2006 Solar Integrated.

Product brochure entitled: S1816G1 (SR2001A) Product Information Solar Panels: Built to Last and Generate Reliable Power—by Solar Integrated.

Product brochure entitled: S1744G1 (SR2004A) Product Information; Solar Panels: Built to Last and Generate Power by Solar Integrated.

\* cited by examiner

SOLAR ROOFING SYSTEM

The present invention claims priority on U.S. Provisional Application Ser. Nos. 61/187,415 filed Jun. 16, 2009; 61/184,984 filed Jun. 8, 2009; and 61/161,252 filed Mar. 18, 2009, all of which are incorporated herein by reference.

FIELD OF THE INVENTION

The present invention relates to solar panels, and generally to solar panels that can be connected to building structures.

BACKGROUND OF THE INVENTION

Rising energy costs, a public awareness to become more energy independent and environmentally friendly, and the reduction in the costs associated with solar panels has resulted in both consumers and commercial entities to consider retrofitting existing buildings with solar panels or to design new buildings that include solar panels. For instance, non-commercial and commercial owners and developers are increasingly considering alternative sources of energy to offset continued price increases of energy. As such, solar energy has received increased attention as an alternative renewable, non-polluting energy source to produce electricity as a substitute to other non-renewable energy resources.

One of the more popular means to generate energy for a building is solar power. Solar panels use a photovoltaic system that converts light energy into electricity. Some building structures have solar panels installed on their rooftops to obtain electricity generated from the sun. These solar panels can be installed on many types of roof systems as "stand alone" solar systems. Most solar panels are mechanically attached (e.g., bolts, screws, nails, rivets, etc.) to the top surface of a roof system. Furthermore, such solar panel systems typically require separate support structures that are typically bolted together to form an array of larger solar panels. The mounting arrays for such solar panels can require structural upgrades to the building due to added weight of the support structures and the solar panels. Additionally, these traditional mechanical arrangements for securing the solar panels to the roofing system require the forming of holes in the roof system surface and/or other modifications to the surface of the roof system that can impair the integrity of the roof surface. For instance, multiple penetrations of the roof membrane when installing the multiple solar panels can compromise the water-tightness of the roof system. Consequently, the water resistant or repellant properties of the roof system can be impaired when installing solar panels on a roof system. In addition to the problems associated with mechanical connectors, the mechanical connectors generally make the removal or repair of one or more solar panels on the roofing system time consuming, difficult and costly, and can also result in additional damage to the roof system. Over time, the solar panels on a roof system become damaged and/or require service. As such, the mechanical connectors must be removed so as to remove the solar panel. The removal of these mechanical connectors can result in damage to the roof system, thereby compromising the water resistant or repellant properties of the roof system. Furthermore, these mechanical connectors can become rusted and corroded overtime, thus becoming difficult to remove, thereby a) increasing the time and cost associated with the repair of the solar panel and/or b) increasing the incidence of damage to the solar panel, solar panel mounting arrangement and/or roofing system.

One common arrangement to connect solar panels to a roofing system without the need of traditional mechanical fasteners is the use of ballast blocks that are laid on a racking system for the solar panels. However, the use of ballast blocks adds significant weight to a roofing system, thus the use of ballast blocks cannot always be used on building structures when such building structures cannot support such added weight. In addition, the use of ballast blocks cannot be used on sloped roof surfaces, thus limiting the use of such arrangements to flat roofing systems.

Another solar panel attachment arrangement is disclosed in United States Patent Publication No. 2008/0245399 and 2008/0245404. A hook and loop connector (e.g., Velcro connector) is used to secure solar panels to a roof surface. Although such a connection arrangement at first appearance may seem appealing, there are many questions concerning whether such a connection arrangement can properly and successfully secure solar roofing panels to a roof surface overtime, especially in wind prone regions or on a sloped roof system.

In view of the current state of solar technology and roof systems, there is a continued need for a solar panel connector that easily, conveniently, and cost effectively connects solar panels to a roof system without damaging the roof system and/or the solar panels, which can be used on many types of roof systems without the need to modify or structurally enhance the roof system, and which can be used on sloped and non-sloped roof systems.

SUMMARY OF THE INVENTION

The present invention relates to a mechanical connection arrangement to removably attach solar panels to a roofing system and/or the siding system of a building or other type of structure. More particularly, the invention relates to a mechanical connection arrangement and method for removably attaching one or more solar panels (e.g., photovoltaic panels) to the surface of a roofing system and/or the siding system of a building or other type of structure. The mechanical connection arrangement of the present invention that is used to removably attach solar panels to the roofing system and/or the siding system is designed to be used with a number of different roof systems (e.g., single ply, MB, BUR, asphalt shingled system, wood shingled system, built-up roofing system, concrete roofing system, metal roofing system, etc.). Indeed, the mechanical connection arrangement of the present invention can be used to removably attach many different types of solar panels to many different, if not all, types of commercial and residential roof systems and/or siding systems. The mechanical connection arrangement of the present invention may also be used to removably connect solar panels to the siding of buildings, houses, and the like. The mechanical connection arrangement of the present invention can be used to attach many different types of solar panels (e.g., framed solar panels, thin film and flexible solar panels, etc.) to the roofing system and/or the siding system. Indeed, the mechanical connection arrangement of the present invention can be used to removably attach most, if not all, types solar panels to a siding system of a building or other type of structure. The mechanical connection arrangement of the present invention is not dependent on the type of solar panel, the configuration of the solar panel, or the materials used to form the solar panel. The mechanical connection arrangement of the present invention used to removably attach solar panels to a roofing system and/or a siding system of a building or other type of structure is designed to 1) be durable, 2) be lightweight, 3) be useable in many different types of weather conditions encountered by such systems, 4) require little or no modifications to the structure of an existing roofing system and/or siding system of a building or other type of structure, 5) be cost effective, and/or 6) be simple to install. As defined herein, a mechanical connector that is designed to removably connect one or more solar panels to a roofing system and/or a siding system of a building or other type of structure includes at least two components, namely 1) a first component that is designed to be connected to the roofing system and/or a siding system of a building or other type of structure, and 2) a second component that is connectable to the first component and which can also be disconnected form the second component without causing the first component to be removed from the roofing system and/or a siding system of a building or other type of structure and/or to damage the roofing system and/or a siding system of a building or other type of structure when the second component is removed from the first component. The second component may or may not be removably connected to one or more of the solar panels. In one non-limiting embodiment of the invention, the mechanical connection arrangement of the present invention includes a mushroom-type hook strip system that is designed to releasably connect one or more solar panels to a roof system and/or a siding system of a building or other type of structure. In one non-limiting arrangement, the mushroom-type hook strip system includes one or more strips wherein the one or more strips may or may not include a flexible backing. As can be appreciated, the mushroom-type hook strip system can be the secondary, primary, or sole connection arrangement used to removably connect one or more solar panels to a roof system and/or a siding system of a building or other type of structure. As can be appreciated, when the mushroom-type hook strip system is not the sole connection arrangement that is used to connect the solar panels to the roof system, the mushroom-type hook strip system can be used in combination with one or more other types of connection arrangements (e.g., Velcro—hook and loop fasteners, adhesives, nails, screws, rivets, staples, stitching, clips, snaps, clamps, etc.) to removably connect one or more solar panels to a roof system and/or a siding system of a building or other type of structure. The backing of the one or more strips of the mushroom-type hook strip system can be formed of many types of materials (e.g., wood, plastic, metal, fiberglass, composite materials, ceramic materials, thermoplastic resin, other types of polymers, reinforced and/or impregnated fabrics, etc.). Positioned on the top side of the backing of the strips is an array of upstanding stems distributed across the top side of the strip. A plurality of these upstanding stems include a generally mushroom head shape. Two strips of the mushroom-type hook strip system are designed to interengage one another when pressed together to thereby form a removably connectable mechanical connection arrangement in accordance with the present invention. The distribution of the upstanding stems on the top side of the strip is typically selected such that there is generally equally spacing of the stems from one another (e.g., square or hexagonal array, etc.); however, this is not required. This type of orientation results in a reduced incidence of breakage of the stems when the strips are pressed together and/or pulled apart. The generally mushroom-head shape of the stems can have smooth, rounded outer surfaces, thus be more user friendly and less abrasive to the skin; however, this is not required. The generally mushroom-head shape of the stems generally have a uniform height (e.g., 5-50 mm) and a substantially uniform spacing of from one another (e.g., 1-20 mm) center to center; however, it can be appreciated that other heights and/or spacing of the stems can be used. Generally, the ratio of the height of the stems to the diameter of the stems is about 2-20:1, and the ratio of the diameter of each mushroom head to the stem is about 1.5:1 to 5:1; however, other height and/or diameter ratios can be used. The thickness and material of the stem can be selected to provide the desired flexibility or rigidity of the stem. Likewise, the thickness and material of the strip can be selected to provide the desired flexibility or rigidity of the strip. The mushroom-type hook strip system can be formed of a variety of materials such as, but not limited to, plastic (e.g, polypropylene, copolymer of polypropylene, polyethylene, resin materials, etc.), metal, ceramic materials, composite materials (fiber glass and resin materials, carbon fibers and resin materials, etc.), resin material, or a combination of one or more of these materials.

Many types of solar panels can be removably secured to a roofing system and/or a siding system of a building or other type of structure by the mechanical connection arrangement in accordance with the present invention. One non-limiting type of solar panel that can be used is a solar panel formed of a reinforced single-ply membrane and a pattern of photovoltaic solar cells. Such solar cells are typically laminated to the membrane and encapsulated in a potting material; however, this is not required. The plurality of solar cells are typically interconnected by conductors with the inner rows being connected to the outer rows by bus bars at one end, and with the other ends terminating in parallel connection bars. Another known "combination" system for solar panels includes an integrated photovoltaic roofing component and panel that reduces the need for separate installers to handle roofing materials and solar and related electrical components. The integrated solar or photovoltaic roofing component and panel includes a flexible membrane sheet and a plurality of elongated solar or photovoltaic modules. The plurality of elongated photovoltaic modules are attached to a top surface of the flexible membrane sheet. Each module is arranged side-by-side or end to end such that the electrical leads are located at adjacent ends of the modules. As such, the wiring ends can be aligned with and/or adjacent to each other to form the integrated photovoltaic roofing component or panel. The electrical interconnections between individual solar cells of the solar module can be completed before the plurality of solar modules are adhered to the flexible membrane; however, this is not required. As a result, an installer may not be required to connect positive and negative electrodes of each individual solar cell, thereby reducing the electrical interconnections between all the solar cells and modules. As such, the integrated photovoltaic roofing panel can be unrolled onto a roof of a building structure and installed and properly connected with fewer electrical components and connections than conventional combination photovoltaic systems. The edges of the elongated solar modules can be encapsulated with a sealant; however, this is not required. The type, shape and/or composition of the solar panels that can be used in the present invention is non-limiting. It is believed that all types of solar panels can be used in the present invention. Non-limiting examples of solar panel arrangements, configurations and/or applications that can be used in the present invention are disclosed in U.S. Pat. Nos. 3,459,597; 4,189,881; 4,193,820; 4,334,120; 4,433,200; 4,485,264; 4,537,838; 4,574,160; 4,636,577; 4,636,578; 4,636,579; 4,674,244; 4,691,076; 4,860,509; 4,886,554; 5,092,939; 5,164,020; 5,232,518; 5,316,592; 5,437,735; 5,482,569; 5,505,788; 5,575,861; 5,590,495; 5,746,839; 5,830,779; 5,968,287; 5,990,414; 5,998,729; 6,050,042; 6,061,978; 6,111,189; 6,117,703; 6,148,570; 6,182,403; 6,201,180; 6,245,987; 6,268,559; 6,295,818; 6,380,477; 6,384,314; 6,421,966; 6,462,265; 6,465,724; 6,472,593; 6,495,750; 6,501,013; 6,534,703; 6,553,729; 6,570,084; 6,617,507; 6,670,541; 6,675,580; 6,729,081; 6,730,841;7,342,171; United States Patent Publication Nos. US 2001/0045228; US 2001/0054262; US 2002/

0043031; US 2002/0046764; US 2002/0078991; US 2002/ 0129849; US 2003/0070368; US 2003/0094193; US 2003/ 0116185; US 2003/0163964; US 2003/0217768; US 2004/ 0144043; US 2005/0072456; US 2005/0178428; US 2005/ 0178429; US 2007/0084501; US 2008/0053519; US 2008/ 0245399; US 2008/0245404; US2008/0245409; Foreign Patent Nos. DE 298 24 045; EP 1856744; EP 1191606; EP 1191605; EP 1742274; EP 1588424; EP 111394; GB 2 296 263; JP 10-102687; JP 11-22127; WO 84/00253; all of which are fully incorporated herein by reference. The manufacture, operation and use of these solar panels are disclosed in detail in the above patents, patent applications and articles, thus such manufacture, operation and use of such solar panels will not be described herein in detail since such information is incorporated herein. The present invention enables various types of solar panels to be easily connected to and/or disconnected from various types of roof systems and/or siding systems. As used in the present invention, the term "flexible solar panel" refers to any type of solar panel that is fully or semi-flexible. Generally, flexible solar panels are thin film systems; however, this is not required. As also used herein, the term "non-flexible solar panels" refers to any solar panel that a generally rigid structure. Generally non-flexible solar panels include one or more rigid plates of silica or glass that may or may be contained in a frame; however, it will be appreciated that such non-flexible solar panels can be formed of other or additional materials, and/or may or may not be framed. As also can be appreciated, some glass or crystalline type solar panels can be secured to a flexible backing (e.g., Lumeta PowerPly), thereby making such glass or crystalline type solar panels semi-flexible. For purposes of this invention, such solar panels are considered "flexible solar panels".

In another and/or alternative non-limiting embodiment of the present invention, the mushroom-type hook strip system includes one or more first strips that are secured to the bottom surface of a solar panel and one or more second strips that are secure to a roof surface, roofing material, siding surface, siding material, or some other structure that is connected to the roof and/or siding surface. The length, width and/or thickness of each of the strips is non-limiting. When a single strip is connected to the bottom surface of a solar panel, the single strip can be applied to the complete bottom surface of the solar panel, or to a portion of the bottom surface of the solar panel. In addition, the width of the strip can be greater, equal to or less than the width of the solar panel. The single strip connected to the bottom surface of the solar panel can be removably or irremovably connected to the bottom surface of the solar panel. Likewise, when a plurality of strips are connected to the bottom surface of a solar panel, the plurality strips can be applied to the complete bottom surface of the solar panel or to a portion of the bottom surface of the solar panel. These strips connected to the bottom surface of the solar panel can be removably or irremovably connected to the bottom surface of the solar panel. In addition, the width of one or more of the strips can be greater, equal to or less than the width of the solar panel. Further more, the one or more strips that are connected to the bottom surface of the solar panel can extend beyond the edges of the solar panel; however, this is not required. If two or more strips are used, the strips can have the same or different length, width and/or thickness. The width and/or thickness of the strips can be the same or vary along the longitudinal length of the strip. Generally, each strip has a width of at least about 0.1 inch, typically about 0.25-50 inches, more typically 0.5-20 inches, and even more typically about 1-5 inches. Furthermore, the strip generally has a thickness of at least about 0.01 inch, typically about 0.1-5 inches, and more typically about 0.2-2 inches. The mushroom-type hook strip system can be used with flexible solar panels and/or non-flexible solar panels. The mushroom-type hook strip system can be used to attach solar panels directly to a roof surface, siding surface, and/or to other structures that are connected to a roof and/or siding surface. The one or more first strips can be connected to the bottom surface of the solar panels by many means (e.g., adhesive or bonding materials, melt bond, rivets, staples, sewn connection, laminations, clamps, etc.). The one or more second strips can be connected to the roof surface or one or more structures on the roof surface and/or siding surface by many means (e.g., adhesive or bonding materials, melt bonded, rivets, laminations, staples, clamps, etc.). Generally, the one or more second strips are connected to the roof surface, siding surface, or one or more structures on the roof surface and/or siding surface at a location that coincides with the desired arrangement of solar panels on the roof system. The use of one or more strips of the mushroom-type hook strip system to removably secure solar panels to a roof system and/or siding system has several advantages such as, but not limited to, 1) allows the solar panels to be releasably connected to a roof system and/or siding system, 2) creates a strong connection between the solar panels and the roofing system and/or siding system such that the solar panels can be connected to sloped and non-sloped roof systems, 3) creates a strong connection between the solar panels and the roofing system and/or siding system such that the solar panels can be connected to roof systems and/or siding system that exist in many types of environments (e.g., windy regions, warm regions, cold regions, tropical regions, etc.), 4) does not create significant added weight to a roof system and/or siding system, 5) allows for fast and simple installation of the solar panels on a roof system and/or siding system, and/or 6) creates an air space between the solar panels and the roofing system and/or siding system that can allow for heat dissipation so as to reduce the incidence of heat damage to the solar panels, and/or the roof system and/or siding system.

In still another and/or alternative non-limiting embodiment of the present invention, at least one strip of the mushroom-type hook strip system is secured at or along a bottom side longitudinal edge and/or end edge of a solar panel. Generally the at least one strip of the mushroom-type hook strip system is irremovably secured to the solar panel; however, this is not required. In one non-limiting arrangement, one strip of the mushroom-type hook strip system is connected along the complete length of the bottom side longitudinal edge and/or end edge of the solar panel. In another non-limiting arrangement, a plurality of strips of the mushroom-type hook strip system are connected along the partial length of the bottom side longitudinal edge and/or end edge of the solar panel. In still another non-limiting arrangement, at least one strip of the mushroom-type hook strip system is connected along at least 50% of the length of the bottom side longitudinal edge and/or end edge of the solar panel. When at least one strip of the mushroom-type hook strip system is connected to less than the complete length of the bottom side longitudinal edge and/or end edge of the solar panel, the at least one strip of the mushroom-type hook strip system is generally connected to at least 60% of the length of the bottom side longitudinal edge and/or end edge of the solar panel, typically at least 75% of the length of the bottom side longitudinal edge and/or end edge of the solar panel, more typically at least 80% of the length of the bottom side longitudinal edge and/or end edge of the solar panel, and still more typically at least 90% of the length of the bottom side longitudinal edge and/or end edge of the solar panel. In yet another non-limiting arrangement, a plurality of strips of the mushroom-type hook strip system are connected along at least 50% of the length of the bottom side longitudinal edge and/or end edge of the solar panel. When a plurality of strips of the mushroom-type hook strip system are connected to less than the complete length of the bottom side longitudinal edge and/or end edge of the solar panel, the a plurality of strips of the mushroom-type hook strip system are generally connected to at least 60% of the length of the bottom side longitudinal edge and/or end edge of the solar panel, typically at least 75% of the length of the bottom side longitudinal edge and/or end edge of the solar panel, more typically at least 80% of the length of the bottom side longitudinal edge and/or end edge of the solar panel, and still more typically at least 90% of the length of the bottom side longitudinal edge and/or end edge of the solar panel. In still yet another and/or alternative non-limiting arrangement, when one or more strips of the mushroom-type hook strip system are connected to the bottom side longitudinal edge and/or end edge of the solar panel, the one or more strips of the mushroom-type hook strip system can be connected so that the edge of the one or more strips of the mushroom-type hook strip system is aligned with the bottom side longitudinal edge, overlaps the bottom side longitudinal edge, and/or end edge of the solar panel or is spaced from the bottom side longitudinal edge and/or end edge of the solar panel. When the one or more strips of the mushroom-type hook strip system are spaced from the bottom side longitudinal edge and/or end edge of the solar panel, the one or more strips of the mushroom-type hook strip system are generally spaced from the bottom side longitudinal edge and/or end edge of the solar panel at a distance of less than about 10 inches, typically less than about 3 inches, more typically less than about 2 inches, and even more typically less than about 1 inch; however, other spacing can be used.

In yet another and/or alternative non-limiting embodiment of the present invention, at least one strip of the mushroom-type hook strip system is secured at or along a plurality of bottom side longitudinal edges and/or end edges of the solar panel. Generally, the flexible solar panel has a generally rectangular shape, thus has two generally long parallel side edges and two generally shorter parallel edge edges. Likewise, non-flexible solar panels also have a generally rectangular shape, thus have two generally long parallel side edges and two generally shorter parallel edge edges. However, it can be appreciated that the flexible solar panel and/or non-flexible solar panel can have a square shape or some other polygonal shape (e.g., triangular, pentagonal, etc.). For such shaped solar panels, any of the generally straight edges of these non-rectangular solar panels can be considered a side longitudinal edge for purposes of this invention.

In still yet another and/or alternative non-limiting embodiment of the present invention, at least one strip of the mushroom-type hook strip system is secured at a location that is spaced from the bottom side longitudinal edges and/or end edges of the solar panel and which is also positioned between two or more strips of the mushroom-type hook strip system that are secured at a location that is closer to the bottom side longitudinal edges and/or end edges of the solar panel. In one non-limiting arrangement, three of more sets of strip of the mushroom-type hook strip system are secured to the bottom of a solar panel. The use of three of more sets of strips of the mushroom-type hook strip system can 1) better secure the solar panel to a roof system, 2) reduce the amount of movement of the solar panel on a roof system, and/or 3) reduce the amount of uplift of the solar panel from the roof system when wind blows on the top surface of the solar panel. In one non-limiting configuration, the first two sets of strip of the mushroom-type hook strip system are secured at or near the bottom side longitudinal edges of the solar panel, and the third set of strip of the mushroom-type hook strip system is positioned between the first two sets of strip and along the longitudinal length of the solar panel. One or two or all three sets of strip of the mushroom-type hook strip system can be formed of a single continuous strip of the mushroom-type hook strip system, or be formed of a plurality of strip sections of the mushroom-type hook strip system. Two or all three sets of strip of the mushroom-type hook strip system can be aligned generally parallel to one another; however, this is not required. Generally, at least two of the three sets of strip of the mushroom-type hook strip system are aligned generally parallel to one another along the longitudinal length of the solar panel. In one non-limiting arrangement, the third set of strips is positioned generally parallel to the first two sets of strip; however, it will be appreciated that the third set of strip can be oriented in other or additional way (e.g., perpendicular to the first two sets of strip, positioned at some non-parallel and non-perpendicular angle to the first to sets of strip, etc.). The third set of strips can be positioned in the center to the first two sets of strip and/or be off-center from the first two sets of strip along the longitudinal length of the solar panel. As can also be appreciated, more than three sets of strip can be connected to the bottom surface of the solar panel. As can also be appreciated, many configurations or patterns of the one or more sets of strip can be connected to the bottom surface of the solar panel.

In a further and/or alternative embodiment of the present invention, the connection arrangement is designed to create a detachable connection having Average Peak Load (pounds per linear inch) of at least about 1.0, typically at least about 1.3, and more typically at least 1.9. In one non-limiting configuration, the connection arrangement creates a detachable connection having Average Peak Load (pounds per linear inch) of about 1.3-10, typically about 1.9-8, more typically about 2-6, and even more typically about 2.1-3. As such, a connection arrangement formed of a 6 inch wide strips having an Average Peak Load 1.0 can resist up to about 6 lbs of continuous pull force (6 inches times 1.0) before the strips separate from one another. Furthermore, a connection arrangement formed of a 6 inch wide strips having an Average Peak Load 1.9 can resist up to about 11.4 lbs of continuous pull force (6 inches times 1.9) before the strips separate from one another. In environments that are periodically exposed to high wind conditions (e.g., costal regions, etc.), connection arrangements that create Average Peak Load or 1.9 or greater are very desirable to resist or prevent the solar panels from be blown off of the roof and/or siding system.

In another and/or alternative non-limiting embodiment of the present invention, the roof surface and/or siding surface can be fully or partially covered with one or more strips of the mushroom-type hook strip system. Generally the one or more strips of the mushroom-type hook strip system are irremovably connected to the roofing and/or siding surface; however, this is not required. When the roof system is not fully covered with one or more strips of the mushroom-type hook strip system, the one or more strips of the mushroom-type hook strip system that are connected to the roof system are typically positioned on the roof system such that one or more of the strips are partially or fully aligned with one or more strips that are connected to the bottom surface of the solar panels; however, this is not required. In one non-limiting arrangement, a plurality of strips of the mushroom-type hook strip system are connected to a roof system such that when the solar panels are connected to the roof system, the strips on the roof system are fully or partially aligned with one or more or all of the strips of the mushroom-type hook strip system that are connected to the bottom of the solar panels. As defined herein, roof system means a pre-existing roof system that has been modified to include the mechanical connection arrangement of the present invention, and/or roofing materials that are attached to the roof of a building or other type of structure, which roofing materials have been preformed or subsequently modified to include the mechanical connection arrangement of the present invention. Framing or mounting structures that are part of the solar panels are considered parts of the solar panels for purposes of this invention.

In still another and/or alternative non-limiting embodiment of the present invention, a non-limiting mushroom-type hook strip system that can be used in the present invention is the 3M Dual Lock™ product or similar type of strip; however, it can be appreciated that other or additional mushroom-type hook strip systems can be used. The 3M Dual Lock strips are self-mating strips that include fasteners which simply reattach to themselves. When pressed together, many of the mushroom heads interlock with one another which can create a sound that indicates that the strips are interlocked; however, this is not required. In one non-limiting embodiment of the invention, the 3M Dual Lock™ product is used to connect a solar panel such as, but not limited to, a flexible solar panel such as available from Uni-Solar (e.g, Uni-Solar PVL-136, etc.) to a roof system. The Uni-Solar Solar flexible solar panels are commercially available in sizes that are about 10-18 inches wide, and 0.1-0.15 inches thick; however other widths and/or thickness can be used. Different lengths of the Uni-Solar flexible solar panels can be use. The Uni-Solar flexible solar panels can include a pre-applied adhesive backing on the bottom side of the solar panels; however, this is not required. The Uni-Solar flexible solar panels typically include a backing material; however, this is not required. The pre-applied adhesive backing, when such backing exists, can be used to fully or partially secure one or more strips of the 3M Dual Lock™ product or similar product to the back side of the Uni-Solar flexible solar panel; however, other or additional arrangements can be used to secure the 3M Dual Lock™ product or similar product to the back side of the Uni-Solar flexible solar panel. When the Uni-Solar flexible solar panels do not include a pre-applied adhesive, an adhesive and/or other type of connection arrangement can be used to secure one or more strips of 3M Dual Lock™ product or similar product to the bottom side of the Uni-Solar flexible solar panels. The one or more strips of 3M Dual Lock™ product or similar product that are connected to the bottom side of the Uni-Solar flexible solar panels can fully or partially cover the bottom side of the Uni-Solar flexible solar panel. Another strip of 3M Dual Lock™ product or similar product can be connected to the top of a roof system or to a structure that is connected to the roof system. Many types of connection arrangements can be used (e.g., adhesive, nails, screws, rivets, etc.) to secure one or more strips of 3M Dual Lock™ product or similar product to the top of a roof system or to a structure that is connected to the roof system. As can be appreciated, the one or more strips of 3M Dual Lock™ product or similar product can include a pre-applied adhesive backing that can be used to secure the strip of 3M Dual Lock™ product or similar product to a bottom of a solar panel, and/or roof system or to a structure that is connected to the roof system; however, this is not required. Utilizing flexible solar panels on a roof system provides a flexible, lightweight solar collection system that can be used on most roof systems without having to structurally re-engineer (e.g., reinforce, etc.) pre-existing roofing systems. The use of the 3M Dual Lock™ product or similar product enables the flexible solar panels to be used on both sloped and non-sloped roof systems. The connection of the one or more strips of 3M Dual Lock™ product or similar product to the flexible solar panel can be done during the manufacturing of the solar panel and/or on site at the location of the roof system. The 3M Dual Lock™ product or similar product can be used to connect flexible and non-flexible solar panels or a roof system. Typically, non-flexible solar panels have a weight that is greater than flexible solar panels; however, this is not required. The non-flexible solar panels, like the flexible solar panels, can include a pre-applied adhesive backing; however, this is not required. This pre-applied adhesive backing can be used to secure one or more strips of the 3M Dual Lock™ product or similar product to the back side of the non-flexible solar panel; however, other or additional arrangements can be used to secure the 3M Dual Lock™ product or similar product to the bottom side of the non-flexible solar panel. When the non-flexible solar panel does not include a pre-applied adhesive, an adhesive and/or other type of connection arrangement can be used to secure one or more strips of 3M Dual Lock™ product or similar product to the bottom side of the non-flexible solar panel; however, it can be appreciated that other or additional connection arrangements can be used. One or more strips of 3M Dual Lock™ product or similar product can be connected to the top of a roof system or to a structure that is connected to the roof system. Many types of connection arrangements can be used (e.g., adhesive, nails, screws, rivets, etc.). The use of the 3M Dual Lock™ product or similar product enables the non-flexible solar panels to be used on both sloped and non-sloped roof systems. The connection of one or more strips of 3M Dual Lock™ product or similar product to the non-flexible solar panel can be done at the manufacturing site of the solar panel or on site at the location of the roof system. Likewise, the connection of one or more strips of 3M Dual Lock™ product or similar product to a roof system or to a structure that is connected to the roof system can be done at the manufacturing site of the roofing material for the roofing system and/or on site at the location of a pre-existing roof system or roofing materials that are being installed on a roof system. In one non-limiting arrangement, 3M Dual Lock™ 250 Series or 400 Series is used to releasably secure the back side of a flexible and/or non-flexible solar panel to a roofing substrate or roofing system. It is has been found that the use of 3M Dual Lock™ 250 Series strips can create and Average Peak Load (pounds per linear inch) of about 1.3, and 3M Dual Lock™ 400 Series strips can create an Average Peak Load (pounds per linear inch) of about 4.0. Therefore, a 12 inch wide sheet of 3M Dual Lock™ 400 Series strip can resist up to about 48 lbs of continuous pull force before the strips separate from one another. This holding force by 3M Dual Lock™ 400 Series strip is greater than a holding force formed by hook and loop systems such as Velcro 3001 Loop/752 Hook. For instance, the Velcro 3001 Loop/752 Hook strips can only create an Average Peak Load (pounds per linear inch) of about 1.8 or only up to about 21.6 lbs of continuous pull force on a 12" wide strip will result in the strips being separated from one another.

In another and/or alternative non-limiting embodiment of the present invention, there is provided a modified non-limiting mushroom-type hook strip system that can be used in the present invention which can be modified to facilitate in the connecting and releasing of a solar panel from a roofing and/or siding system. The modified mushroom-type hook strip system can be connected to a solar panel and/or roofing and/or side material in the same or similar manner as described above. The size, length shape, etc. of the modified mushroom-type hook strip system and/or mushrooms on the strip can also or alternatively be the same or similar to the mushroom-type hook strip system and/or mushrooms on the strip as described above. In one non-limiting aspect of this embodiment of the invention, the stems and/or mushroom-head shape of the stems are formed of a polymer material that is designed to be heated to cause the polymer material to soften and enable the strips of mushroom-type hook strip system to be connected together and/or separated from one another. The polymer is formulated such that when it is heated within a certain temperature rage, the polymer softens, but does not melt. The polymer used to form the mushroom shaped stems can be formed of one or more polymers. The polymer composition of the mushroom head can be the same or different from the polymer composition of the stem portion of the mushroom shaped stems. The polymer composition of the mushroom shaped stems on one strip of connection material can be the same or different from the polymer composition of the mushroom shaped stems on another strip of connection material. For instance, the polymer composition of the mushroom shaped stems on a strip of connection material located on the solar panel can be the same or different from the polymer composition of the mushroom shaped stems on the strip of connection material located on the roofing and/or siding material. As also can be appreciated, two or more strip of connection material located on the roofing and/or siding material, and/or the solar panel can have the same or different polymer composition for the mushroom shaped stems on the strip of connection material. The softening of the polymer allows the mushroom shaped stems on the connection strip to be malleable so that mushroom shaped stems on another connection strip can interengage with one another and form a connection between the two strips. In one non-limiting design, the temperature that the polymer softens so as to enable an easy connection between two strips of connection material is at least about 100-500° F., typically at least about 150° F., more topically at least about 200, and even more typically at least about 250° F. The heating temperature of the polymer is typically less than the melting point and degradation temperature of the polymer. Generally, the maximum heating temperature of the polymer is up to about 800° F., typically up to about 600° F., more typically up to about 500° F., even more typically up to about 400° F., and still even more topically up to about 300° F. The heating of the mushroom shaped stems on one or more strips of connection material can be accomplished in many different methods. One non-limiting heating method includes the use of heated air that is blown onto the mushroom shaped stems. Another non-limiting heating method includes the use of heating iron that is positioned on or adjacent to the mushroom shaped stems. In another non-limiting embodiment of the invention, when the mushroom shaped stems on one or more strips of connection material are heated to the desired softening point, the connection material has a holding or connection force of an Average Peak Load of less than about 1, typically less than about 0.8, more typically less than about 0.6, even more topically less than about 0.4, and still yet even ore typically less than about 0.3. In still another non-limiting embodiment of the invention, when the mushroom shaped stems on one or more strips of connection material cool to ambient temperature (e.g., −50° F.-180° F.), the connection material has a holding or connection force of an Average Peak Load of at least about 1, typically at least about 1.5, more typically at least about 2.0, even more typically at least about 2.5, yet even more typically at least about 3, still even more typically at least about 4, still yet even more typically at least about 5, and even more typically at least about 6.

In yet another and/or alternative non-limiting embodiment of the present invention, there is provided an adhesion platform for use on the solar panel and/or roofing system and/or siding system; however, this is not required. The use of an adhesion platform on the roof surface and/or siding surface, and/or on the bottom surface of the solar panel is optional. The adhesion platform when used, is used to enhance the strength of the bond between one or more strips of the mushroom-type hook strip system and the roof surface and/or siding surface, and/or on the bottom surface of the solar panel. The adhesion platform is generally one or more strips of material that are bonded to the roof surface and/or siding surface, and/or on the bottom surface of the solar panel. The one or more strips of material of the adhesion platform can fully or partially cover the bottom surface of the solar panel and/or the top surface of a roof system and/or siding system. The type of material used to form the strip of adhesion platform is non-limiting. Generally, the adhesion platform is formed of wood, mesh material, fleece material, woven and/or non-woven material, metal material, ceramic material, fiber glass material, composite material, plastic material, polymer coating, plated material and/or some combination thereof. As can also be appreciated, the adhesion platform can be formed of a coating of one or more materials on the bottom surface of the solar panel and/or the top surface of a roof system and/or siding system. The adhesion platform can be secured and/or applied to the roof surface and/or siding surface, and/or on the bottom surface of the solar panel by any number of arrangements. Non-limiting examples of securing arrangements include, but are not limited to, mechanical arrangements (e.g., nail, screw, bolt, clamp, rivet, staple, lock, snap, tongue and groove connection, etc.); welded or soldered connections; melted bonding; adhesive bonding (e.g., adhesives, bitumen coatings, modified bitumen coatings, coal tar and/or asphalt coatings, etc.); and/or combinations of any of these connection arrangements. When the adhesion platform is or includes a coating, non-limiting examples of coating process include, but are not limited to, plating; coating (e.g., dip coating, spray coating, air-knife, brush coating, etc.); and/or combinations of any of these connection arrangements. As can be appreciated, the connection arrangement that is used to connect one or more strips of the mushroom-type hook strip system to the surface of the strip of adhesion platform can be the same or different from the connection arrangement used to secure the strip of adhesion platform to the roof surface and/or on the bottom surface of the solar panel. As can also be appreciated, the connection arrangement that is used to secure the one or more strips of adhesion platform to the roof surface and/or on the bottom surface of the solar panel can be 1) partially or fully pre-applied to the strip of adhesion platform, and/or 2) partially or fully pre-applied to roof surface and/or on the bottom surface of the solar panel; however, this is not required. As can also be appreciated, the connection arrangement that is used to secure to the one or more strips of adhesion platform to the one or more strips of the mushroom-type hook strip system can be 1) partially or fully pre-applied to the strip of adhesion platform, and/or 2) partially or fully pre-applied to the one or more strips of the mushroom-type hook strip system; however, this is not required. As can also be appreciated, the adhesion platform can be a modified portion of the bottom surface of a solar panel and/or a top surface of a roofing material that was formed during the manufacturing process of the solar panel and/or roofing material. As such, the adhesion platform in such instances may not necessarily be a strip of material on the solar panel and/or roofing material, but may instead be a specially prepared or modified region of the solar panel and/or roofing material that is designed to be connected to one or more strips of the mushroom-type hook strip system. The strip of adhesion platform is not limited in shape, size, and/or thickness. In one non-limiting configuration, the thickness of the strip of adhesion platform is generally uniform; however, this is not required. In one non-limiting design, the thickness of the strip of adhesion platform is at least about 0.00005 inches, generally at least about 0.0001 inches, typically about 0.0001-3 inches, more typically about 0.0005-1 inches, and still more typically about 0.001-0.5 inches. The width of the strip of adhesion platform is non-limiting. The width of the strip of adhesion platform may be constant or may vary along the longitudinal length of the strip of adhesion platform. In one non-limiting design, width of the strip of adhesion platform is generally up to about ±20 inches the width of the strip of the mushroom-type hook strip system that is be connected to the strip of adhesion platform, generally up to about ±10 inches the width of the strip of the mushroom-type hook strip system that is be connected to the strip of adhesion platform, typically up to about ±5 inches the width of the strip of the mushroom-type hook strip system that is be connected to the strip of adhesion platform, and more typically up to about ±1 inches the width of the strip of the mushroom-type hook strip system that is be connected to the strip of adhesion platform In. As can be appreciated, the width of the strip of adhesion platform can be the same as the width of the strip of the mushroom-type hook strip system that is be connected to the strip of adhesion platform. In another non-limiting design, width of the strip of adhesion platform is generally up to about ±20 inches the width of the bottom surface of the solar panel is be connected to the strip of adhesion platform, generally up to about +10 inches the width of the bottom surface of the solar panel that is be connected to the strip of adhesion platform, typically up to about ±5 inches the width of the bottom surface of the solar panel that is be connected to the strip of adhesion platform, and more typically up to about ±1 inches the width of the bottom surface of the solar panel that is be connected to the strip of adhesion platform. As can be appreciated, the width of the strip of adhesion platform ill can be the same as the width of the bottom surface of the solar panel that is be connected to the strip of adhesion platform. The strip of adhesion platform can be pre-applied to the roof surface and/or on the bottom surface of the flexible thin film solar panel and/or framed solar panel, or be applied on-site. When a strip of adhesion platform is to be applied to a pre-existing roofing system, the surface of the roofing system can be prepared (e.g., clean roof surface, remove granules from roof surface, etc.) prior to securing the strip of adhesion platform to the roof surface; however, this is not required. When new roofing material is to be applied to a new or pre-existing roof system, the new roofing material may or may not include a pre-existing strip of adhesion platform.

In still yet another and/or alternative non-limiting embodiment of the present invention, a roofing material that can be used to secure a flexible and/or non-flexible solar panel to the top surface of the roofing material and/or siding material can be at least partially formed from a bitumen, modified bitumen, asphalt and/or coal-tar material that includes composite fabric that is at least partially impregnated with a bituminous, asphalt and/or coal-tar composition. As can also be appreciated, the roofing system and/or siding system can be a metal roofing and/or siding system. One or more adhesion platforms can be formed on and/or are connected to the top surface of the roofing material and/or siding material; however, this is not required. In one non-limiting configuration, the composite fabric includes one or more layers of woven or non-woven material connected to one or more layers of low shrinkage warp strands and/or one or more layers of low shrinkage weft strands. The composite fabric layers can be stitched together, knitted together, at least partially melted together or otherwise bound together to maintain the integrity of the composite fabric; however, this is not required. The composite fabric layers can be coated with a resin or sizing to prevent slippage between the several layers of the fabric and impart a measure of stiffness to the fabric; however, this is not required. Non-limiting examples of bitumen, modified bitumen, asphalt and/or coal-tar roofing materials that can be used are disclosed in U.S. Pat. Nos. 5,474,838; 5,540,971; 5,695,373; 6,296,921, which are incorporated herein by reference.

In another and/or alternative non-limiting embodiment of the present invention, a roofing and/or siding material that is to be installed on a roof and/or siding of a building can be pre-manufactured to include 1) a prepared surface that is designed to receive a connection arrangement (e.g, strip of adhesion platform, strip of mushroom-type hook strip system, strip of some other type of connection arrangement, etc.), 2) a prepared surface that includes a removable cover or film, which prepared surface is designed to receive a connection arrangement (e.g, strip of adhesion platform, strip of mushroom-type hook strip system, strip of some other type of connection arrangement, etc.), 3) a pre-applied strip of mushroom-type hook strip system and/or strip of some other type of connection arrangement (e.g., Velcro, etc.), 4) a pre-applied strip of adhesion platform, or 5) a pre-applied strip of adhesion platform, which adhesion platform includes a pre-applied strip of mushroom-type hook strip system and/or strip of some other type of connection arrangement (e.g., Velcro, etc.) that has been applied to the adhesion platform. The pre-manufactured roofing material can be rolled-up into a roll of roofing and/or siding material for easy transport to the location of installation; however, this is not required. The manufacturing process for making the roofing and/or siding material is non-limiting. In one non-limiting manufacturing process, the one or more strips of adhesion platform, strip of mushroom-type hook strip system, and/or strip of some other type of connection arrangement are applied to the top surface of the roofing and/or siding material by 1) applying the one or more strips to the warm or hot surface of the roofing and/or siding material to form a heat bond between the one or more strips and the top surface of the roofing and/or siding material, 2) applying the one or more strips to the surface of the roofing and/or siding material, which bottom surface of the one or more strips includes an adhesive or other type of bonding agent, to form in a bond between the one or more strips and the top surface of the roofing and/or siding material, 3) applying the one or more strips to the surface of the roofing and/or siding material, which top surface of the roofing and/or siding material includes an adhesive or other type of bonding agent, to form a bond between the one or more strips and the top surface of the roofing and/or siding material, 4) applying the one or more strips to the surface of the roofing and/or siding material, which bottom surface of the one or more strips includes an adhesive or other type of bonding agent and the top surface of the roofing and/or siding material includes an adhesive or other type of bonding agent, to form a bond between the one or more strips and the top surface of the roofing and/or siding material, 5) mechanically connecting one or more strips to the top surface of the roofing and/or siding material by use of one or more mechanical connection arrangements (e.g., nails, screws, rivets, staples, stitching, clips, snaps, clamps, etc.), and/or 6) connecting one or more strips to the top surface of the roofing and/or siding material by use of a melted bond, welded bond, or solder bond to form a connection between the one or more strips and the top surface of the and/or siding roofing material. When granules or some other type of texture is to be applied to the top of the roofing and/or siding material, the one or more strips of adhesion platform, strips of mushroom-type hook strip system, and/or strips of some other type of connection arrangement can be applied before, during or after such granules or some other type of texture is to be applied to the top of the roofing and/or siding material. In one non-limiting manufacturing process, the one or more strips of adhesion platform, strips of mushroom-type hook strip system, and/or strips of some other type of connection arrangement are applied to the roofing and/or siding material before granules or some other type of texture is applied to the top of the roofing and/or siding material. In such a manufacturing process, a removable protective film or cover can be applied to one or more portions of the top surface of the roofing and/or siding material to protect the covered surface portion prior to one or more strips of adhesion platform, strips of mushroom-type hook strip system, and/or strips of some other type of connection arrangement being secured to the covered portion; however, this is not required. As such, the removable protective film or cover can be used to keep the covered portion of the roofing and/or siding materials clean from dirt and/or other material that could interfere with the securing of one or more strips of adhesion platform, strips of mushroom-type hook strip system, and/or strips of some other type of connection arrangement being secured to the covered portion. In addition, the removable protective film or cover can be used to keep the covered portion of the roofing and/or siding materials clean from granules and/or other types of texture material that is applied to the top surface of the roofing and/or siding material. After such granules and/or other types of texture material are applied to the top surface of the roofing and/or siding material, when such granules and/or other types of texture material are used, the removable protective film or cover can then be removed from the top surface of the roofing and/or siding material so that one or more strips of adhesion platform, strips of mushroom-type hook strip system, and/or strips of some other type of connection arrangement can be properly secured to the covered portion. The removal of the protective film or cover and the subsequent connection of the one or more strips of adhesion platform, strips of mushroom-type hook strip system, and/or strips of some other type of connection arrangement can occur at the manufacturing site of the roofing material, or can occur at a location remote from the manufacturing site (e.g., on-site at the location of the roofing system of a building, etc.), and prior to and/or after the roofing and/or siding material is applied to a building or other type of structure. In any of the non-limiting manufacturing processes described above, heat and/or pressure (e.g, pressure rollers, etc.) can be used to facilitate in forming a bond between the one or more strips and the roofing and/or siding material.

In still another and/or alternative non-limiting embodiment of the present invention, a) one or more strips of adhesion platform, and/or b) one or more strips of connection arrangement are secured to the top surface of a roofing and/or siding material. In one non-limiting manufacturing process for a roofing and/or siding material, there is provided a reinforcement material that is at least partially coated with and/or at least partially impregnated with bitumen, modified bitumen, asphalt and/or coal-tar by passing the reinforcement material through a coating, rolling and/or pressing process. As can be appreciated, other processes can be used to coat the reinforcement material with the bitumen, modified bitumen, asphalt and/or coal-tar composition. As can also be appreciated, more than one coating of bitumen, modified bitumen, asphalt and/ or coal-tar composition can be applied to the reinforcement material. After the reinforcement material is passed through the coating, rolling and/or pressing process, then a) one or more strips of adhesion platform, and/or b) one or more strips of connection arrangement can be applied to one or more portions of the roofing and/or siding material to cause the a) one or more strips of adhesion platform, and/or b) one or more strips of connection arrangement to be at least partially laminated to one or more portions of the top surface of the roofing and/or siding material. As can be appreciated, additional amounts of bitumen, modified bitumen, asphalt and/or coal-tar material and/or an adhesive material can be applied to one or more portions of the top surface of the roofing and/or siding material prior to and/or after applying the a) one or more strips of adhesion platform, and/or b) one or more strips of connection arrangement to the top surface of a roofing and/or siding material; however, this is not required. After the a) one or more strips of adhesion platform, and/or b) one or more strips of connection arrangement are applied to the top surface of a roofing material, the roofing and/or siding material can be heated and/or moved over and/or between one or more drums and/or rollers to facilitate in securing the a) one or more strips of adhesion platform in, and/or b) one or more strips of connection arrangement, to the top surface of a roofing and/or siding material; however, this is not required. Typically the a) one or more strips of adhesion platform, and/or b) one or more strips of connection arrangement are applied to one or more portions of the top surface of the roofing and/or siding material prior to the cooling and/or curing of the bitumen, modified bitumen, asphalt and/or coal-tar composition so as to enable the bottom surface of the a) one or more strips of adhesion platform, and/or b) one or more strips of connection arrangement to be secured to the top surface of the roofing and/or siding material; however, this is not required. Once the roofing and/or siding material passes from the one or more drums and/or between the one or more sets of press rollers, when such rollers and/or drums are used, the roofing and/or siding material can be guided to a cooling section; however, this is not required.

In yet another and/or alternative non-limiting embodiment of the present invention, there is provided a pre-manufactured roofing and/or siding material that includes a top surface of a highly reflective material, which highly reflective material has a resulting or effective reflectivity of at least about 55%, typically at least about 60%, more typically at least about 65%, and even more typically about 70-99.9%. One non-limiting roofing and/or siding material that includes such highly reflective material is disclosed in United States Patent Publication No. 2009-0064628, which is fully incorporated herein. The top surface of such roofing and/or siding material can include a) one or more strips of adhesion platform, b) one or more strips of connection arrangement, and/or c) one or more solar panels that are secured to the top surface of the roofing material. The a) one or more strips of adhesion platform, b) one or more strips of connection arrangement, and/or c) one or more solar panels can be partially or fully applied during the manufacturing of the roofing and/or siding material, and/or can be partially or fully applied prior to, during and/or after the installation of the roofing and/or siding material on a roof system.

In still yet another and/or alternative non-limiting embodiment of the present invention, a solar panel that is to be installed on a roof and/or siding of a building can be pre-manufactured to include 1) a prepared surface that is designed to receive a connection arrangement (e.g, strip of adhesion platform, strip of mushroom-type hook strip system, strip of some other type of connection arrangement), 2) a prepared surface that includes a removable cover or film, which prepared surface is designed to receive a connection arrangement (e.g, strip of adhesion platform, strip of mushroom-type hook strip system, strip of some other type of connection arrangement), 3) a pre-applied strip of mushroom-type hook strip system and/or strip of some other type of connection arrangement (e.g., Velcro, etc.), 4) a pre-applied strip of adhesion platform, or 5) a pre-applied strip of strip of adhesion platform, which adhesion platform includes a pre-applied strip of mushroom-type hook strip system and/or strip of some other type of connection arrangement (e.g., Velcro, etc.). The pre-manufactured solar panel can be a flexible solar panel that is rolled-up into a roll for easy transport to the location of installation; however, this is not required. The manufacturing process for making a modified solar panel is non-limiting. In one non-limiting manufacturing process, the one or more strips of adhesion platform and/or one or more strips of mushroom-type hook strip system, and/or strip of some other type of connection arrangement are applied to the bottom surface of the solar panel by 1) applying the one or more strips to the warm or hot bottom surface of the solar panel to form a heat bond between the one or more strips and the bottom surface of the solar panel, 2) applying the one or more strips to the bottom surface of the solar panel, which bottom surface of the one or more strips includes an adhesive or other type of bonding agent, to form a bond between the one or more strips and the bottom surface of the solar panel, 3) applying the one or more strips to the bottom surface of the solar panel, which bottom surface of the solar panel includes an adhesive or other type of bonding agent, to form a bond between the one or more strips and the bottom surface of the solar panel, 4) applying the one or more strips to the bottom of the solar panel, which bottom surface of the one or more strips includes an adhesive or other type of bonding agent and the bottom surface of the solar panel includes an adhesive or other type of bonding agent, to form a bond between the one or more strips and the bottom surface of the solar panel, 5) mechanically connecting one or more strips to the bottom of the solar panel by use of one or more mechanical connection arrangements (e.g., nails, screws, rivets, staples, stitching, clips, snaps, clamps, etc.), and/or 6) connecting one or more strips to the top surface of the roofing and/or siding material by use of a melted bond, welded bond, or solder bond to form a connection between the one or more strips and the bottom surface of the solar panel. In one non-limiting manufacturing process, a removable protective film or cover can be applied to one or more portions of the bottom surface of the solar panel so as to protect such region of the solar panel until one or more strips of adhesion platform, and/or strips of mushroom-type hook strip system, and/or strips of some other type of connection arrangement are to be applied to the bottom surface of the solar panel; however, this is not required. The removal of the film or cover and subsequent connection of the one or more strips of adhesion platform, and/or one or more strips of mushroom-type hook strip system, and/or strips of some other type of connection arrangement can occur at the manufacturing site of the solar panel, or can occur at a location remote from the manufacturing site (e.g., on-site at the location of the roofing system of a building, etc.). In any of the non-limiting manufacturing processes described above, heat and/or pressure (e.g, pressure rollers, etc.) can be used to facilitate in forming a bond between the one or more strips and the solar panel.

In another and/or alternative non-limiting embodiment of the present invention, there is provided a pre-manufactured flexible solar panel wherein one or more photovoltaic cells are secured to the top surface of a highly reflective material, which highly reflective material has a resulting or effective reflectivity of at least about 55%, typically at least about 60%, more typically at least about 65%, and even more typically about 70-99.9%. The highly reflective material is generally a light colored material such as, but not limited to, a white colored material. The highly reflective material can include polyvinylidene fluoride; however, this is not required.

In still another and/or alternative non-limiting embodiment of the present invention, there is provided a method for installing solar panels on a preexisting roof and/or siding system. Many different method steps can be used in accordance with the present invention. In one non-limiting method, a new roofing and/or siding material is placed over a preexisting roofing and/or siding material. The new roofing and/or siding material can be a manufactured roofing and/or siding material designed for use with a solar panel as discussed above. In another non-limiting method, the pre-existing roofing and/or siding material is used when the solar panels are secured to the roof and/or siding system. When the pre-existing roofing material is used, the following method steps can be used, namely 1) prepare the top surface of pre-existing roofing and/or siding material to secure one or more strips of adhesion platform, strips of mushroom-type hook strip system, and/or strips of some other type of connection arrangement to the top surface of the pre-existing roofing and/or siding material, 2) secure one or more strips of adhesion platform, strips of mushroom-type hook strip system, and/or strips of some other type of connection arrangement to the prepared top surface of the pre-existing roofing and/or siding material, and 3) secure one or more solar panels to the one or more strips of adhesion platform, strips of mushroom-type hook strip system, and/or strips of some other type of connection arrangement that is connected to the top surface of the pre-existing roofing and/or siding material. The step of preparing the top surface of pre-existing roofing and/or siding material can include one or more steps, namely i) cleaning the top surface of the pre-existing roofing and/or siding material of debris, grime, dirt, and/or loose material, ii) removing granules from a portion of a granulated pre-existing roofing and/or siding material, iii) repairing damaged portions of the pre-existing roofing and/or siding material, and/or iv) applying a foundation layer (e.g., bitumen coating, coal tar coating, polymer coating, etc.) to at least a portion of the top surface of the pre-existing roofing and/or siding material. The steps 2 and 3 of the method can occur at the same or different time periods. In one non-limiting method, step 2 occurs prior to step 3. When steps 2 and 3 occur at the same time, the bottom surface of the solar panels already includes one or more strips of adhesion platform, strips of mushroom-type hook strip system, and/or strips of some other type of connection arrangement that are secured to the bottom surface of the solar panel. As such, the bottom side of the pre-attached strip(s) of adhesion platform, strip(s) of mushroom-type hook strip system, and/or strip(s) of some other type of connection arrangement are secured to the top surface of the pre-existing roofing and/or siding material at the same time the solar panel is laid on the top surface of the pre-existing roofing material. The solar panels that are secured to the pre-existing roofing material for steps 2 or 3 can be special pre-manufactured solar panels as discussed above; however, this is not required.

In still yet another and/or alternative non-limiting embodiment of the present invention, there is provided an evaluation method for determining how to secure one or more solar panels to a roofing system. In one non-limiting method, the first step of the evaluation method is to determine the type of roofing system to be installed on a building or that exists on the building. If there is a pre-existing roof system, then it needs to be determined whether a solar panel system can be installed on the pre-existing roof system with or without modification to the pre-existing roof system or whether a new roofing material needs to be installed on the roof of the building. The roofing system must also be evaluated to determine whether it is a sloped or non-sloped roofing system. After the roof of the building is evaluated, the next step is to determine the type of solar panel that can be installed on the roof system. The strength of the roof of the building and the weather conditions (e.g., seasonal wind conditions, seasonal temperature changes, etc.) that the solar panels will be exposed to will be factors in the type of solar panel selected. Once the type of solar panel is selected, then the next step is to determine the connection arrangement to be used to connect the solar panels to the roof system. One factor that needs to be considered is whether the connection arrangement will be a releasable or non-releasable connection arrangement. Another factor that needs to be considered is whether an adhesion platform for the roofing system and/or the solar panel will be required. Still another factor is the type of connector to be used (e.g., size, shape, configuration of the connectors, etc.). Another factor to be considered is the connector strip pattern that is to be used on the top of the roof system and/or on the bottom of the solar panels.

One non-limiting object of the present invention is to provide an improved connection arrangement between a roofing and/or siding system and a solar panel.

In another and/or alternative non-limiting object of the present invention is to provide a mechanical connection arrangement that forms a releasable connection between a solar panel and a roofing and/or siding system.

In still yet another and/or alternative non-limiting object of the present invention is to provide a mechanical connection arrangement includes the use of one or more strips of the mushroom-type hook strip system to releasably secure a solar panel to a roofing and/or siding system.

In another and/or alternative non-limiting object of the present invention is to provide a connection arrangement includes the use of an adhesion platform to improve the connection of a solar panel to a roofing and/or siding system.

In still another and/or alternative object of the present invention, the partial or complete bottom surface of the solar panel can include one or more strips of the mushroom-type hook strip system.

In yet another and/or alternative object of the present invention is to connect solar panels to a roof and/or siding of a building or other type of structure.

In still yet another and/or alternative object of the present invention is to connect solar panels to a roof and/or siding of a building or other type of structure without having to reinforce the roof and/or siding of a building or other type of structure.

In still another and/or alternative object of the present invention pertains to the manufacturing of solar panels and/or roofing and/or siding material that includes a connection arrangement and/or adhesion platform that can be used to connected solar panels to a roof and/or siding of a building or other type of structure.

In yet another and/or alternative object of the present invention pertains to modifying a pre-existing roof and/or siding system so that solar panels can be connected the roof and/or siding of a building or other type of structure.

These and other objects and advantages will become apparent from the following description taken together with the accompanying drawings.

BRIEF DESCRIPTION OF THE DRAWINGS

Reference may now be made to the drawings, which illustrate several non-limiting embodiments that the invention may take in physical form and in certain parts and arrangements of parts wherein.

DESCRIPTION OF NON-LIMITING EMBODIMENTS OF THE INVENTION

Figure 1:
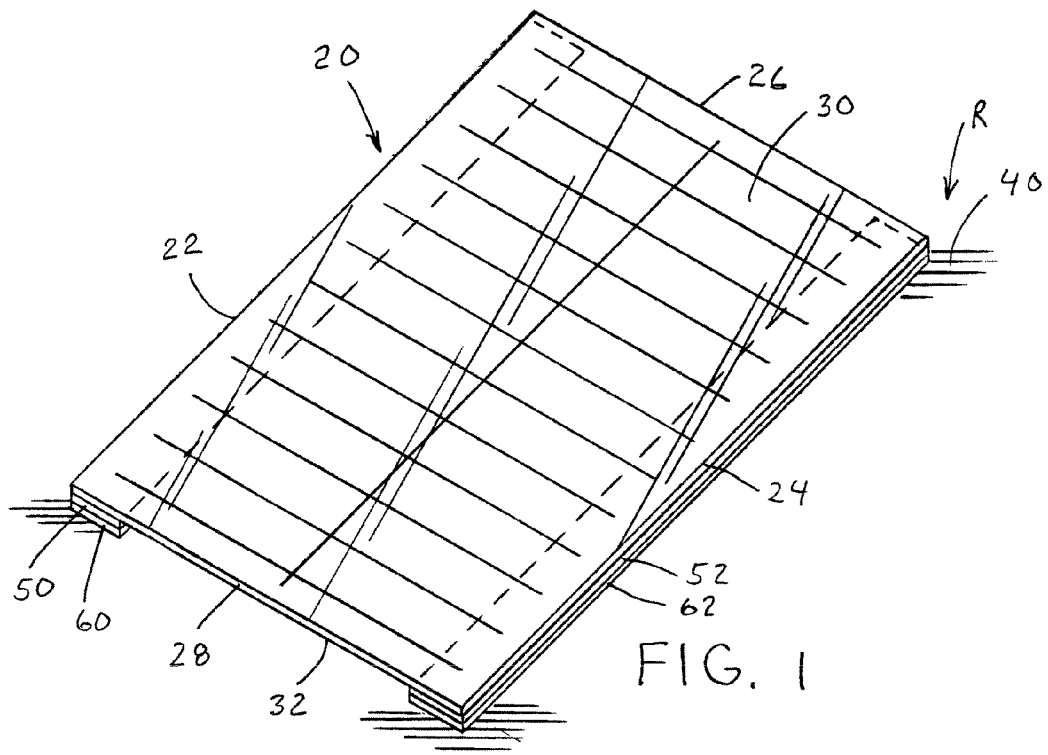
FIG. 1 illustrates a flexible solar panel that is releasably connected to a roof and/or siding system by use of strips of connection material.

Referring now to the drawings wherein the showings are for the purpose of illustrating non-limiting embodiments of the invention only and not for the purpose of limiting same, FIG. 1 illustrates a flexible solar panel 20 that is releasably connected to a top surface 40 of a roof system R. As can be appreciated, solar panel 20 can be releasably connected to surfaces other than a top surface of a roof system (e.g., siding of a building, floor, top or side of a structure other than a building, etc.). The scope of the present invention encompasses all surfaces in which a solar panel is connectable to such surface. The roof system R can be a sloped and/or non-sloped roof system. The materials used to form the roof system are non-limiting for purposes of this invention. For purposes of describing the following non-limiting embodiments of the invention, the solar panel will be described as being connected to a roof system R.

Referring again to FIG. 1, solar panel 20 is a flexible solar panel. All solar panels can be classified as either flexible or non-flexible solar panels. The terms flexible and non-flexible solar panel have been previously defined above for purposes of this invention. The type of flexible solar panel that can be used in the present invention is non-limiting. Furthermore, the size, shape, thickness, etc. of the flexible solar panel that can be used in the present invention is also non-limiting. As illustrated in FIG. 1, the flexible solar panel 20 has a generally rectangular shape and has two longitudinal side edges 22, 24 and two end edges 26, 28. The longitudinal edges are illustrated as being longer than the end edges. The flexible solar panel also has a top surface 30 and a bottom surface 32. The top surface of the flexible solar panel typically includes one or more photovoltaic cells. The configuration, composition, size, shape, etc. of the one or more photovoltaic cells is non-limiting. The one or more photovoltaic cells are generally connected together by various means. The manufacture and configuration of flexible solar panels that can be used in the present invention will not be further described since such details regarding the manufacture, configuration, composition, size, shape, etc. of flexible solar panels are included in the patents, patent publication, patent applications and articles that are incorporated herein by reference.

Two strips of connection material 50, 52 are illustrated as being connected to the bottom surface 32 of the flexible solar panel and at or adjacent to the two longitudinal side edges 22, 24 of the flexible solar panel. Also, two strips of connection material 60, 62 are illustrated as being connected to the top surface 40 of roof system R. The strips of connection material 50, 52 can be connected to the bottom surface 32 of the flexible solar panel in a variety of ways (e.g., adhesive, hot melt, bitumen coatings, polyurethane coatings, stitching, rivets, staples, etc.). Likewise, the strips of connection material 60, 62 can be connected to the top surface 40 of the roof system in a variety of ways (e.g., adhesive, hot melt, bitumen coatings, polyurethane coatings, stitching, rivets, staples, tacks, nails, screws, etc.). The manner in which the connection material is connected to the flexible solar panel and/or roof system is non-limiting. Generally, the type of means used to connect the connection material to the flexible solar panel and/or roof system is selected so that the connection material stays connected to the flexible solar panel and/or roof system when the flexible solar panel is unconnected from the roof system; however, this is not required. In one non-limiting arrangement, an adhesive is used to secure strips 50, 52 to the solar panel. In another and/or alternative non-limiting arrangement, an adhesive is used to secure strips 60, 62 to the roof system R. The strips of connection material 50, 52 are illustrated as being generally aligned with the two longitudinal side edges 22, 24 of the flexible solar panel along the longitudinal length of the flexible solar panel; however, it can be appreciated that a portion of one or both of strips of connection material 50, 52 can extend outwardly from (i.e., overlap) one or both longitudinal side edges 22, 24 of the flexible solar panel along one or more portions of the longitudinal length of the flexible solar panel, and/or a portion of one or both of strips of connection material 50, 52 can be spaced inwardly from one or both longitudinal side edges 22, 24 of the flexible solar panel along one or more portions of the longitudinal length of the flexible solar panel. When one or both of strips of connection material 50, 52 are spaced inwardly from one or both longitudinal side edges 22, 24 of the flexible solar panel along one or more portions of the longitudinal length of the flexible solar panel, the spacing distance is generally less than 6 inches, and generally about 0.25-4 inches; however, other spacing distances can be used. As also illustrated in FIG. 1, the strips of connection material 50, 52 are illustrated as continuous strips; however, it can be appreciated that one or both strips may not be continuous along the longitudinal length of the flexible solar panel. As also illustrated in FIG. 1, the strips of connection material 50, 52 are illustrated as terminating at the two end edges 26, 28 of the solar panel; however, it can be appreciated that one or both strips can terminate at some spaced distance inwardly from two end edges 26, 28 of the solar panel, or can extend beyond one or both edges. When one or both of strips of connection material 50, 52 are spaced inwardly from one or both end edges 26, 28 of the flexible solar panel, the spacing distance is generally less than 6 inches, and generally about 0.25-4 inches; however, other spacing distances can be used.

Strips of connection material 50, 52 are illustrated has having a rectangular shape and having a generally constant thickness along the longitudinal length of the strip; however, it can be appreciated that one or both strips can have a non-rectangular shape and/or a non-constant thickness along the longitudinal length of one or both strips. The width of strips of connection material 50, 52 are illustrated as being the same; however, this is not required. The width of strips of connection material 50, 52 are also illustrated as being less than the width of the flexible solar panel. Generally, the ratio of the width of at least one strip of connection material to the width of the flexible solar panel along one or more portions of the longitudinal length of the strip of connection material and solar panel is about 0.005-1.5:1, typically about 0.01-1.2:1, and more typically about 0.02-1:1. As is evident from these width ratios, the width of the strip of connection material can be equal to or greater than the width of the flexible solar panel. In such a configuration, the bottom surface of the flexible solar panel typically includes only a single strip of connection material. When two or more strips of connection material are connected to the bottom surface of the flexible solar panel, one or more of the strips of connection material generally have a width ratio to the flexible solar panel of about 0.005-0.5:1, typically about 0.01-0.4:1, more typically about 0.02-0.3:1, and even more typically about 0.05-0.25:1.

Figure 9:
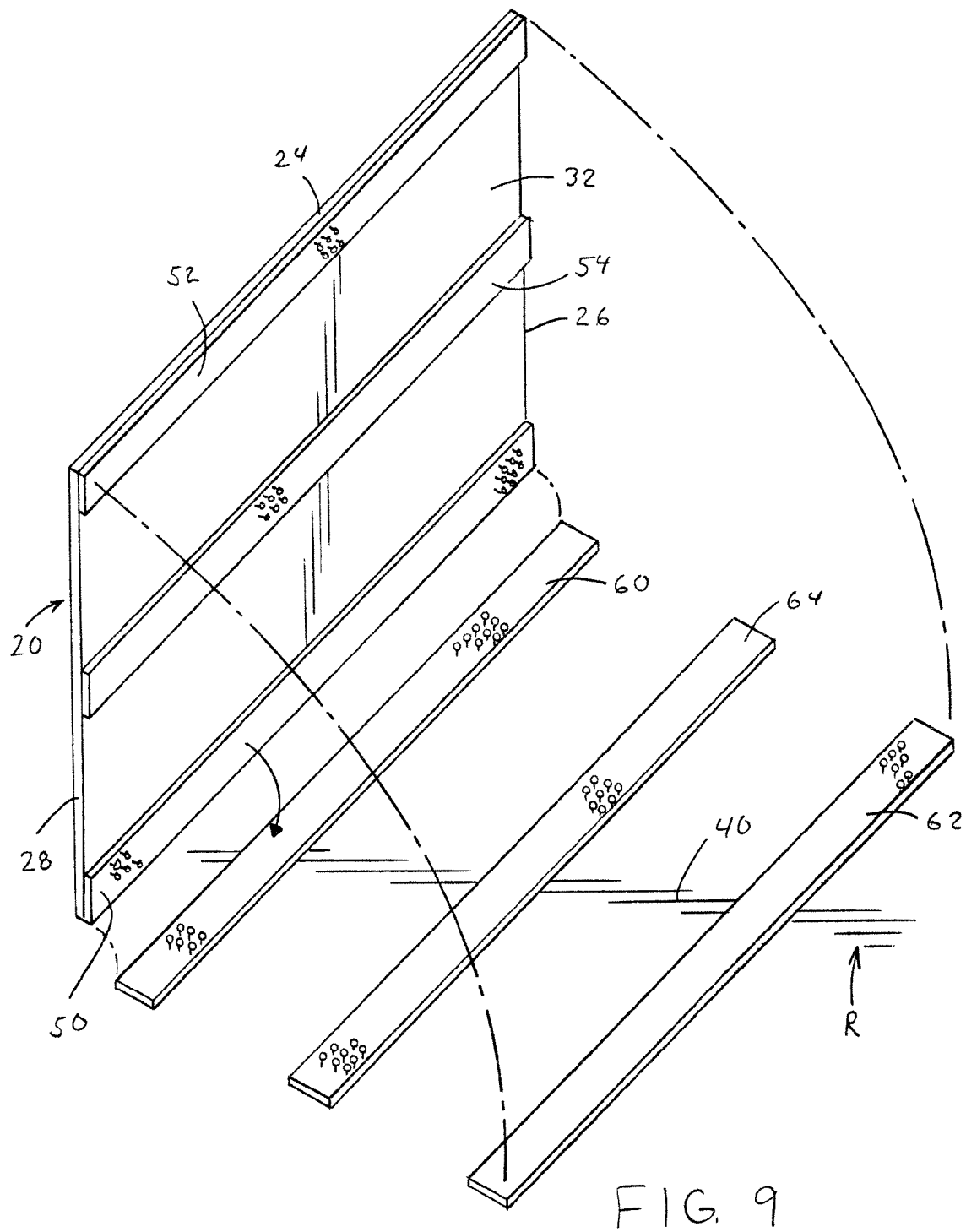
FIG. 9 illustrates a solar panel that is releasably connected to a roof and/or siding system by use of three sets of strips of connection material wherein the solar panel includes three sets of strips of connection material connected to the bottom surface of the solar panel and the top surface of a roof and/or siding system includes three sets of strips of connection material connected to the roof system.
Figure 10:
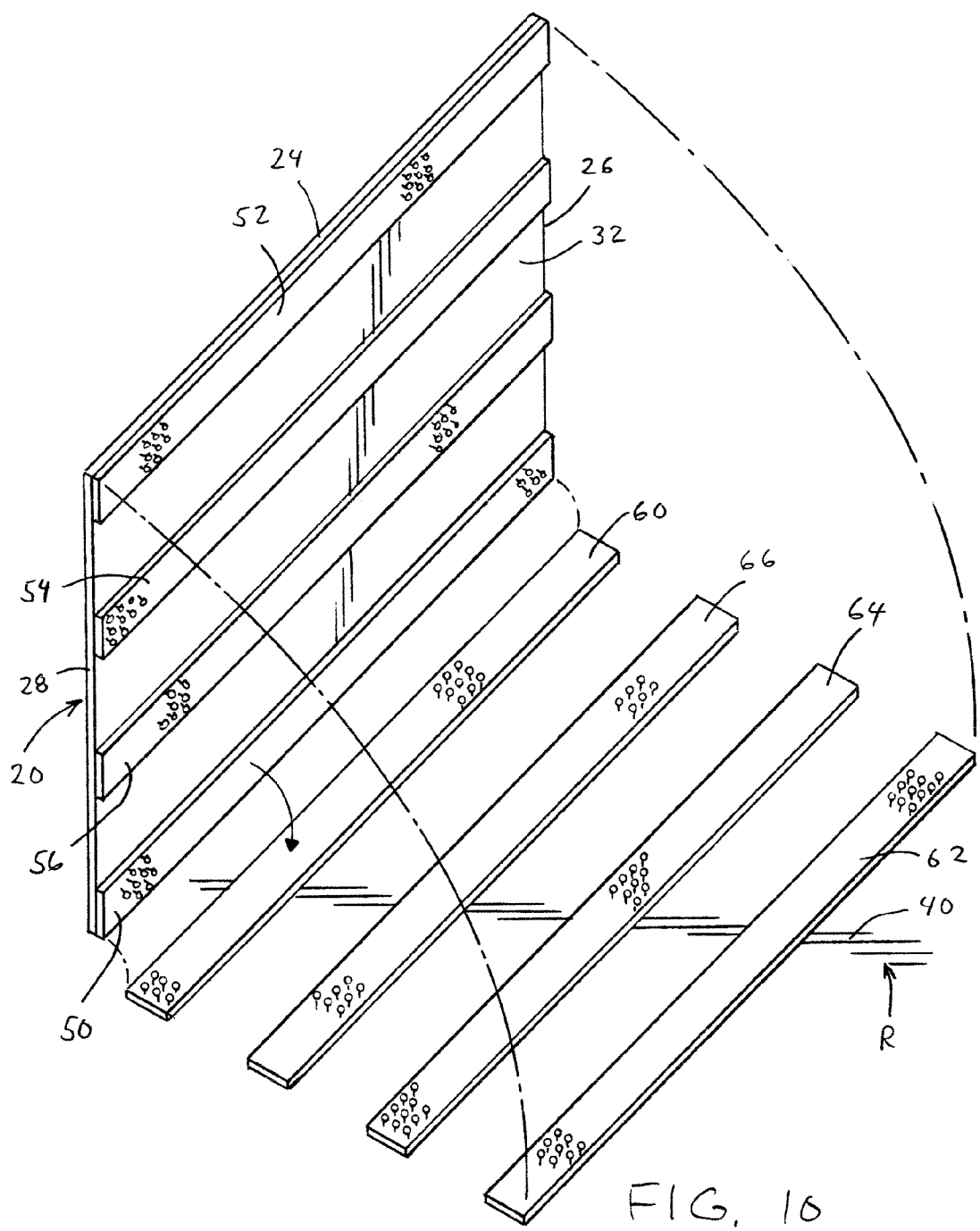
FIG. 10 illustrates a solar panel that is releasably connected to a roof and/or siding system by use of four sets of strips of connection material wherein the solar panel includes four sets of strips of connection material connected to the bottom surface of the solar panel and the top surface of a roof and/or siding system includes four sets of strips of connection material connected to the roof system.

As illustrated in FIGS. 9 and 10, more than two strips of connection material can be used to secure the flexible solar panel 20 to the top 40 of roof system R. FIG. 9 illustrates three strips of connection material 50, 52, 54 that are connected to the bottom surface 32 of flexible solar panel 20. FIG. 10 illustrates four strips of connection material 50, 52, 54, 56 that are connected to the bottom surface 32 of flexible solar panel 20. As can be appreciated, more than four strips of connection material can be connected to the bottom surface 32 of flexible solar panel 20. In both FIGS. 9 and 10, the strips of connection material that are connected to the bottom surface 32 of flexible solar panel 20 are spaced at equal distances apart; however, this is not required. FIG. 9 illustrates that strip of connection material 54 is positioned along the center of the bottom surface of the flexible panel. FIG. 10 illustrates that strips of connection material 54, 56 are spaced at equal distances from the center of the bottom surface of the flexible panel. As can be appreciated, many other orientations of the three, four or more strip system can be used. The width and thickness of the strips in FIGS. 9 and 10 are generally the same. The longitudinal lengths of the strips is also generally the same. Although not illustrated, strips of connection material 50, 52 in FIG. 9 can have a greater or smaller width than the width of strip of connection material 54. Likewise, strips of connection material 50, 52 in FIG. 10 can have a greater or smaller width than the width of strips of connection material 54, 56. Furthermore, one or more of the strips in FIGS. 9 and 10 can have a different longitudinal length from one or more of the other strips on the solar panel.

Figure 2:
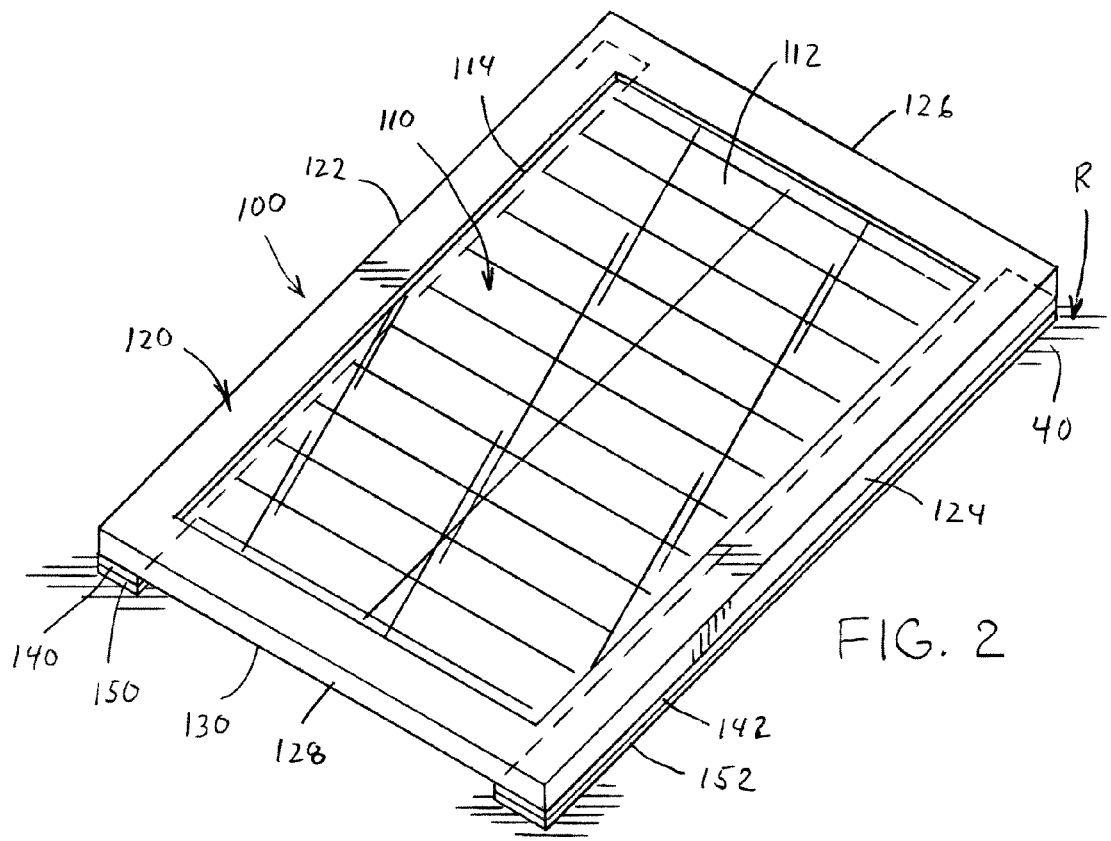
FIG. 2 illustrates a non-flexible solar panel that is releasably connected to a roof and/or siding system by use of strips of connection material.

Referring now to FIG. 2, solar panel 100 is a non-flexible solar panel. The term non-flexible solar panel has been previously defined above for purposes of this invention. The type of non-flexible solar panel that can be used in the present invention is non-limiting. Furthermore, the size, shape, thickness, etc. of the non-flexible solar panel that can be used in the present invention is also non-limiting. As illustrated in FIG. 2, the non-flexible solar panel 100 includes a generally rigid plate 110 and a frame 120 that is connected to the peripheral edge 114 of rigid plate 110. The generally rigid plate 110 and the frame 120 have a generally rectangular shape; however, this is not required. As can be appreciated, some non-flexible solar panels may not include a frame. For purposes of describing one non-limiting embodiment of the invention, the non-flexible solar panel will be described as including a frame. As will be described in more detail below, one or more strips of connection material are designed to be connected to a bottom surface of the frame so that the non-flexible solar panel can be connected to a roof system. However, it will be appreciated that for non-flexible solar panels that do not include a frame or do not include a frame about the complete peripheral edge of the rigid plate, the one or more strips of connection material can be connected to the bottom surface of the rigid plate. The rigid plate 110 has a top surface 112 that typically includes one or more photovoltaic cells. The configuration, composition, size, shape, etc. of the one or more photovoltaic cells is non-limiting. The one or more photovoltaic cells are generally connected together by various means. The manufacture and configuration of rigid plate 110 that can be used in the present invention will not be further described since such details regarding the manufacture, configuration, composition, size, shape, etc. of rigid plate 110 are included in the patents, patent publication, patent applications and articles that are incorporated herein by reference. Frame 120 of non-flexible solar panel 100 has two longitudinal side edges 122, 124, two end edges 126, 128, and a bottom surface 134. The longitudinal edges are illustrated as being longer than the end edges.

Two strips of connection material 140, 142 are illustrated as being connected to the bottom surface 134 of frame 120 of non-flexible solar panel 100 and at or adjacent to the two longitudinal side edges 122, 124 of the frame. Also, two strips of connection material 150, 152 are illustrated as being connected to the top surface 40 of roof system R. The strips of connection material 140, 142 can be connected to the bottom surface 134 of the frame 120 in a variety of ways (e.g., adhesive, hot melt, bitumen coatings, polyurethane coatings, stitching, rivets, staples, etc.). Likewise, the strips of connection material 150, 152 can be connected to the top surface 40 of the roof system in a variety of ways (e.g., adhesive, hot melt, bitumen coatings, polyurethane coatings, stitching, rivets, staples, tacks, nails, screws, etc.). The manner in which the connection material is connected to the frame of the non-flexible solar panel and/or roof system is non-limiting. Generally, the type of means used to connect the connection material to the frame of the non-flexible solar panel and/or roof system is selected so that the connection material stays connected to the frame of the non-flexible solar panel and/or roof system when the non-flexible solar panel is disconnected from the roof system; however, this is not required. The strips of connection material 140, 142 are illustrated as being generally aligned with the two longitudinal side edges 122, 124 of the frame of the non-flexible solar panel along the longitudinal length of the frame; however, it can be appreciated that a portion of one or both strips of connection material 140, 142 can extend outwardly (i.e., overlap) from one or both longitudinal side edges 122, 124 of the frame along one or more portions of the longitudinal length of the frame, and/or a portion of one or both strips of connection material 140, 142 can be spaced inwardly from one or both longitudinal side edges 122, 124 of the frame along one or more portions of the longitudinal length of the frame. When one or both of strips of connection material 140, 142 are spaced inwardly from one or both longitudinal side edges 122, 124 of the frame along one or more portions of the longitudinal length of the frame, the spacing distance is generally less than 6 inches, and generally about 0.25-4 inches; however, other spacing distances can be used. As also illustrated in FIG. 2, the strips of connection material 140, 142 are illustrated as continuous strips; however, it can be appreciated that one or both strips may not be continuous along the longitudinal length of frame 120. As also illustrated in FIG. 2, the strips of connection material 140, 142 are illustrated as terminating at the two end edges 126, 128 of frame 120; however, it can be appreciated that one or both strips can terminate at some spaced distance from two end edges 126, 128 of the frame, or extend beyond one or more of the end edges. When one or both of strips of connection material 140, 142 are spaced inwardly from one or both end edges 126, 128 of the frame, the spacing distance is generally less than 6 inches, and generally about 0.25-4 inches; however, other spacing distances can be used.

Strips of connection material 140, 142 are illustrated has having a rectangular shape and a generally constant thickness along the longitudinal length of the strip; however, it can be appreciated that one or both strips can have a non-rectangular shape and/or a non-constant thickness along the longitudinal length of one or both strips. The width of strips of connection material 140, 142 are illustrated as being the same; however, this is not required. The width of strips of connection material 140, 142 are also illustrated as being about the same width as the frame; however, this is not required. Generally, the ratio of the width of at least one strip of connection material to the width of the frame of the non-flexible solar panel along one or more portions of the longitudinal length of the strip of connection material and frame is about 0.05-1.5:1, typically about 0.1-1.2:1, and more typically about 0.2-1:1. As is evident from these width ratios, the width of the strip of connection material can be equal to or greater than the width of the frame.

Figure 3:
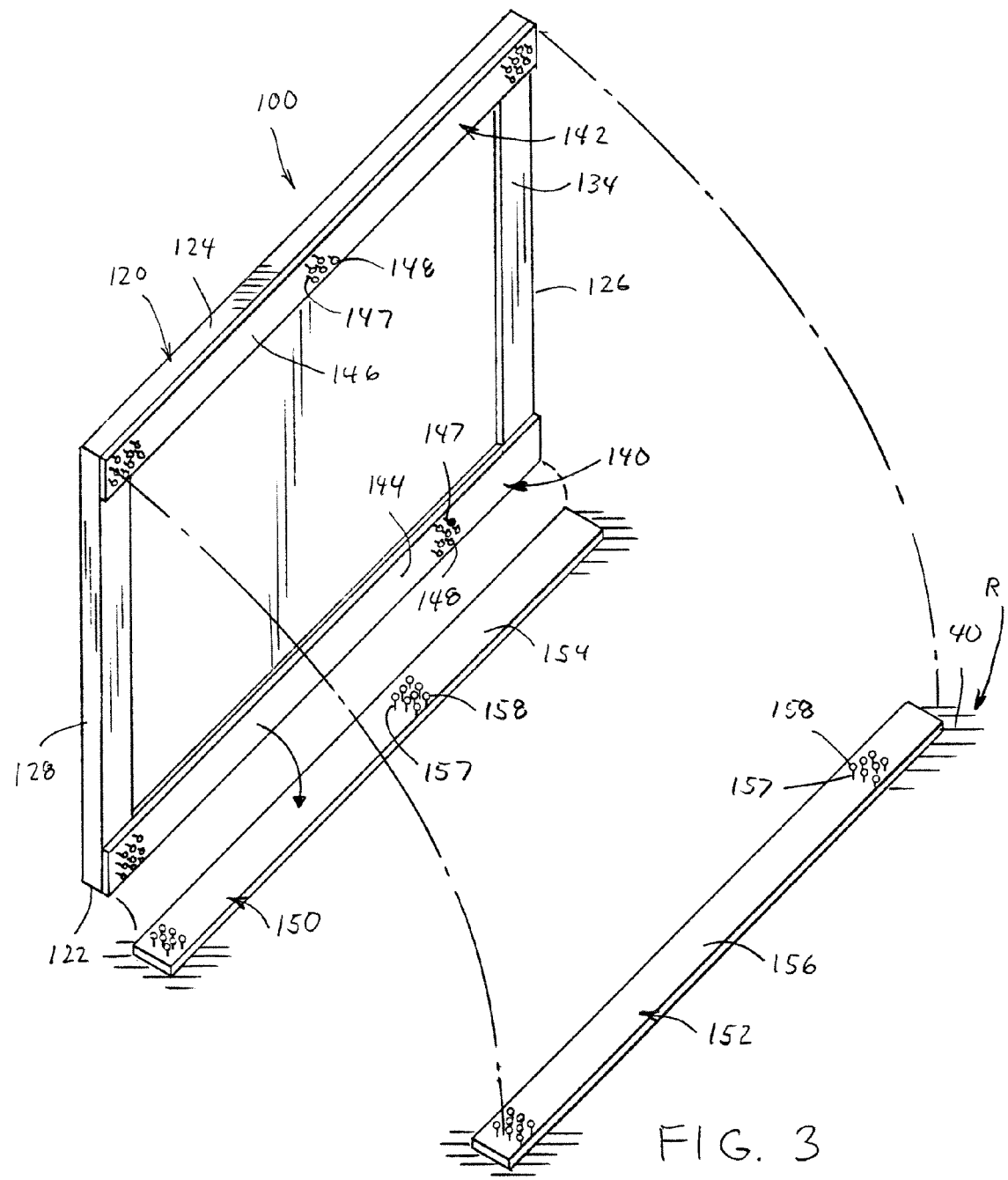
FIG. 3 illustrates a non-flexible solar panel that includes strips of connection material connected to the bottom surface of the non-flexible solar panel and connection material that is connected to a top surface of a roof and/or siding system.

Referring now to FIG. 3, there is illustrated a non-flexible solar panel 100 that is in the process of being secured to the top surface 40 of a roof system R. Strips 150, 152 are connected to the top surface of the roof system so that the strips will at least partially align with strips 140, 142 on the non-flexible solar panel. As illustrated by the arrows, the non-flexible solar panel is oriented and laid on the roof system such that the top surface 144 of strip 140 contacts the top surface 154 of strip 150, and the top surface 146 of strip 142 contacts the top surface 156 of strip 152. This arrangement is illustrated in FIG. 2. As illustrated in FIG. 2, the strips 150, 152 are exactly aligned with strips 140, 142 when the non-flexible solar panel is connected to the roof system; however, it can be appreciated that the strips do not have to be exactly aligned with one another.

Figure 4:
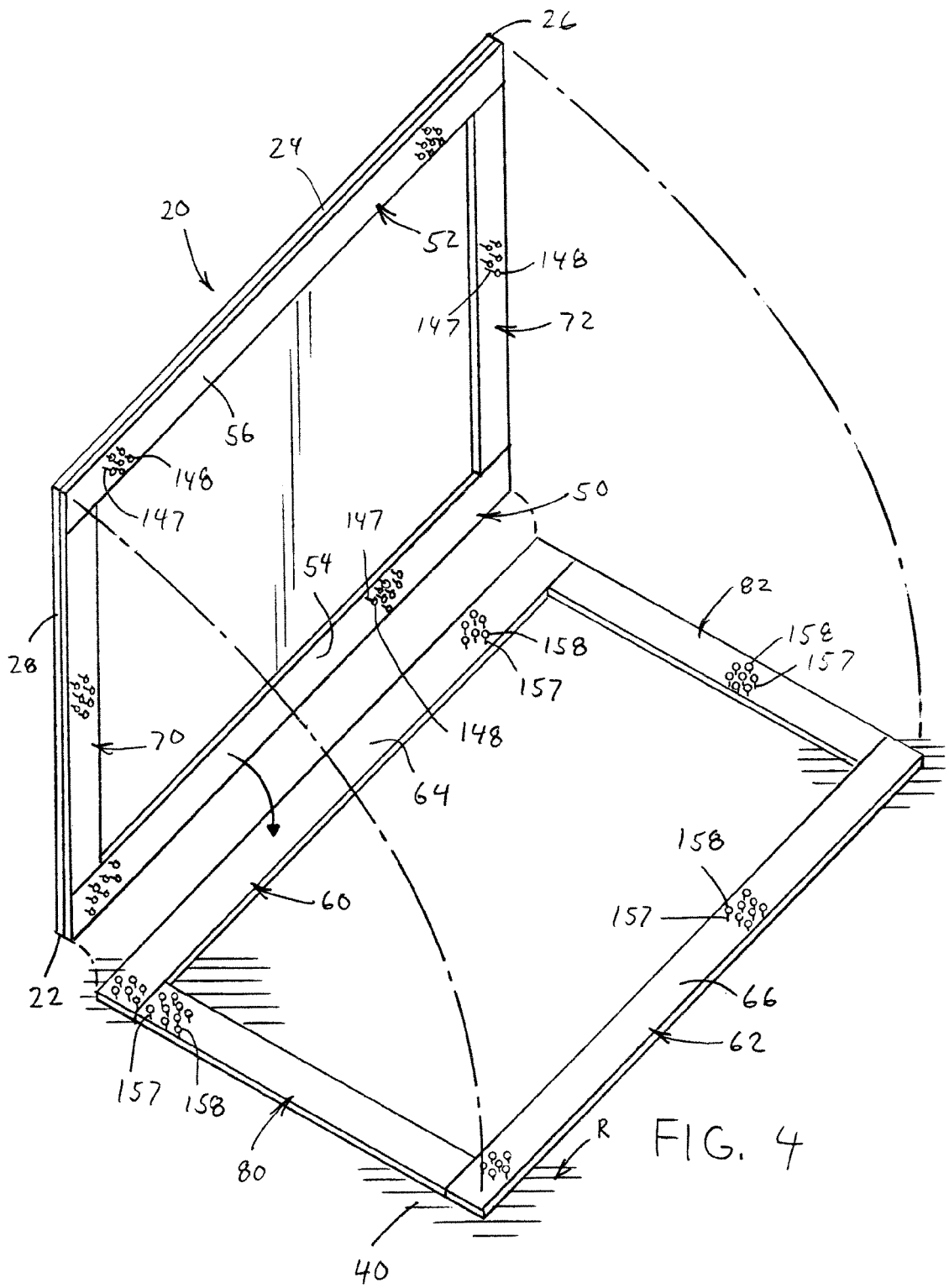
FIG. 4 illustrates a flexible solar panel that includes strips of connection material connected to the bottom surface of the flexible solar panel and connection material that is connected to a top surface of a roof and/or siding system.

Referring now to FIG. 4, there is illustrated a flexible solar panel 20 that is in the process of being secured to the top surface 40 of a roof system R. Strips 60, 62 are connected to the top surface of the roof system so that the strips will at least partially align with strips 50, 52 on the flexible solar panel. As illustrated by the arrows, the flexible solar panel is oriented and laid on the roof system such that the top surface 54 of strip 50 contacts the top surface 64 of strip 60, and the top surface 56 of strip 52 contacts the top surface 66 of strip 62. This arrangement is illustrated in FIG. 1. As illustrated in FIG. 1, the strips 50, 52 are exactly aligned with strips 60, 62 when the flexible solar panel is connected to the roof system; however, it can be appreciated that the strips do not have to be exactly aligned with one another. As also illustrated in FIG. 4, the flexible solar panel 20 includes two end strips 70, 72 of connection material. Strips 70 and 72 are illustrated as running along substantially the full width of the flexible solar panel; however, this is not required. Strips 70 and 72 are illustrated as being positioned on or closely adjacent to edges 26, 28 of the flexible solar panel; however, this is not required. Strips 70, 72 are illustrated as being single strips of connection material; however, this is not required. Strips 70, 72 are illustrated as being positioned between the ends of strips 50, 52, however, it will be appreciated that strips 70 and/or 72 can extend closer or fully to side edges 22, 24 of the flexible panel and that the ends of strips 50, 52 can terminate at a spaced distance from ends 26 and/or 28 of the flexible solar panel; however, this is not required. As also can be appreciated, two or more of the strips can overlap; however, this is not required. As also illustrated in FIG. 4, two strips 80, 82 of connection material are secured to the top surface 40 of roof system R.

Strips 80 and 82 are illustrated as being single strips of connection material; however, this is not required. Strips 80, 82 are illustrated as being positioned between the ends of strips 60, 62, however, it will be appreciated that the ends of strips 60, 62 can terminate into strips 80, 82 and/or two or more the strips can overlap; however, this is not required. Strips 80, 82 are positioned on the top surface 40 of roof system R so that such strips are fully or partially aligned with strips 70, 72 when the flexible solar panel is placed on the roofing system. The use of strips 70, 72, 80, 82 is optional. These strips of connection materials, when used, facilitate in maintaining end edges 26, 28 of the flexible panel connected to the top surface 40 of roof system R. In one non-limiting arrangement, the strips of connection material are positioned on or closely adjacent to (e.g., within 3 inches, within 2 includes, within 1 inch, etc.) at least about 60% of the outer edge of the flexible panel, more typically at least about 75% of the outer edge of the flexible panel, even more typically at least about 80% of the outer edge of the flexible panel, still more typically at least about 90% of the outer edge of the flexible panel, and even still more typically at least about 95% of the outer edge of the flexible panel. Although not illustrated in FIGS. 2 and 3, a similar arrangement can be used for the strips of connection material on the rigid solar panel; however, this is not required.

Figure 6:
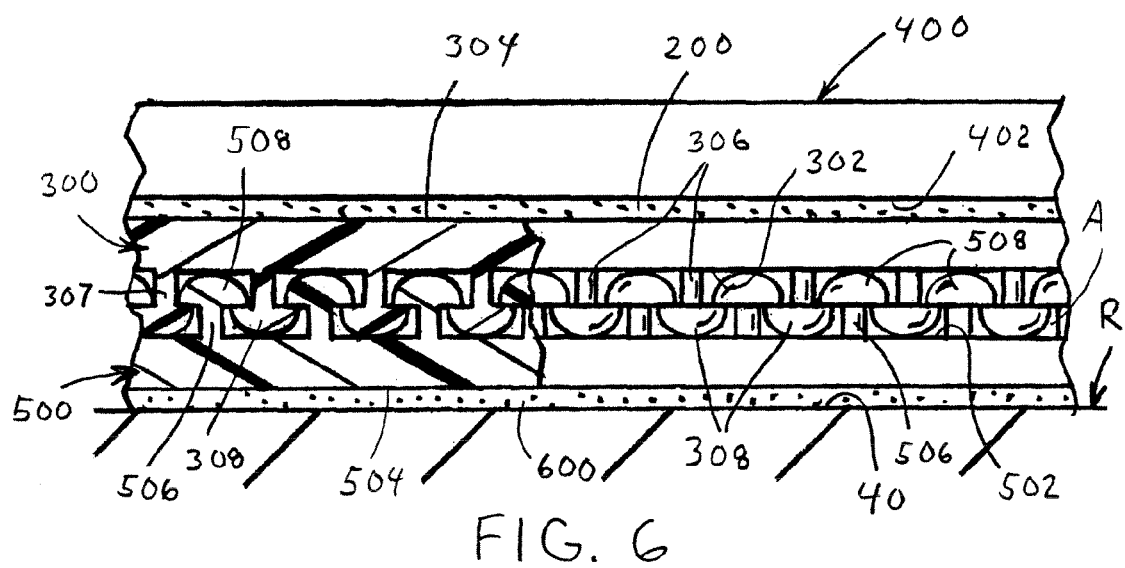
FIG. 6 illustrates a solar panel that is releasably connected to a roof and/or siding system by use of strips of connection material wherein the solar panel includes strips of connection material connected to the bottom surface of the solar panel by an adhesive/boding material and the top surface of a roof and/or siding system includes strips of connection material connected to the roof and/or siding system by an adhesive/bonding material.

As illustrated in FIGS. 1-4, the strips of connection material are a releasable mechanical connection material. One non-limiting releasable mechanical connection material that can be fully or partially used in the present invention is 3M Dual Lock™. The 3M Dual Lock ™ is just one type of mechanical connection arrangement that uses a mushroom-type hook strip system designed to be releasably connected together. The one or more strips of mushroom-type hook strip system may or may not include a flexible backing. The mushroom-type hook strip system can be the primary, principal or only connection arrangement that is used to connect one or more solar panels to the roof system. Positioned on the top surface of the strips of mushroom-type hook strip system is an array of upstanding stems 147, 157 distributed across the top surface of strips 50, 52, 54, 56, 60, 62, 64, 66, 70, 72, 80, 82, 140, 142, 150, 152. These upstanding stems include a generally mushroom head shape 148, 158. The generally mushroom shape stems generally have a uniform height (e.g., 5-50 mm) and a substantially uniform spacing from one another (e.g., 1-20 mm); however, it can be appreciated that other heights and/or spacing of the stems can be used. Generally, the ratio of the height of the stems to the diameter of the stems is about 2-20:1, and the ratio of the diameter of each mushroom head to the stem is about 1.5:1 to 5:1; however, other height and/or diameter ratios can be used. Two strips of the mushroom-type hook strip system are designed to interengage one another when pressed together to form a releasable mechanical connection between the two strips. An example of such interengagement of the generally mushroom head shapes on the strips so as to form a releasable connection is illustrated in FIG. 6 which is described in more detail below. It has been found that a 12 inch wide sheet of 3M Dual Lock™ 400 Series strip can resist up to about 48 lbs of continuous pull force before the strips separate from one another. This holding force by 3M Dual Lock™ 400 Series strip is greater than a holding force formed by hook and loop systems such as Velcro 3001 Loop/752 Hook. For instance, the Velcro 3001 Loop/752 Hook strips can only create and Average Peak Load (pounds per linear inch) of about 1.8 or, only up to about 21.6 lbs of continuous pull force on a 12" wide strip will result in the strips being separated from one another.

Figure 5:
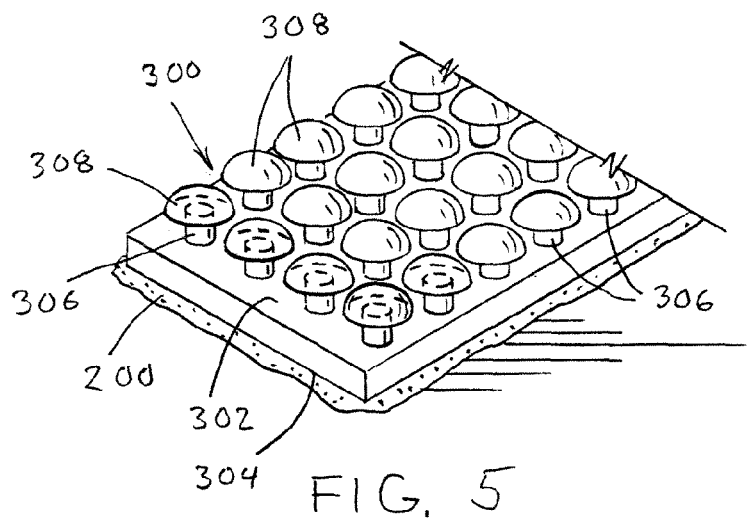
FIG. 5 illustrates an adhesive/bonding material that is used to connect a strip of connection material to a top surface of a roof and/or siding system and/or to a bottom surface of a solar panel.

Referring now to FIG. 5, a strip of connection material 300 such as, but not limited to, 3M Dual Lock™ can be secured to the bottom surface of a flexible solar panel, the bottom surface of a rigid plate of a non-flexible solar panel, the bottom surface of a frame of a non-flexible solar panel, and/or the top surface of a roof system by the use of an adhesive 200. Many different types of adhesives can be used, thus the type of adhesive is non-limiting. In one non-limiting arrangement, the connection material includes an adhesive backing on the strip 300. In another and/or alternative non-limiting arrangement, the adhesive is a material that is applied to the backing on strip 300 and/or on the top surface of roofing R prior to the strip being connected to the roofing surface. As illustrated in FIG. 5, the strip of connection material includes a top surface 302 and a bottom surface 304. The bottom surface 304 is connected by adhesive 200 to the bottom surface of a flexible solar panel, the bottom surface of a rigid plate of a non-flexible solar panel, the bottom surface of a frame of a non-flexible solar panel, and/or the top surface of a roof system, not shown. The top surface 302 of strip 300 includes a plurality of upstanding stems 306 that have a generally mushroom head shape 308 on the top of each of the stems.

Referring again to FIG. 6, there is illustrated a solar panel such as, but not limited to, a flexible solar panel 400 that includes one or more strips of connection material 300 connected to the bottom surface 402 of the flexible solar panel by an adhesive 200. As illustrated in FIG. 6, the adhesive 200 is positioned between the bottom surface 304 of the connection material and the bottom surface 402 of the flexible solar panel. The top surface 302 of the connection material includes a plurality of upstanding stems 306 that have a generally mushroom head shape 308 on the top of each of the stems. The generally mushroom head shapes 308 are illustrated as being interengaged with generally mushroom head shapes 508 of connection material 500. The strip of connection material 500 is illustrated as being connected by an adhesive 600 to the top surface 40 of roof system R. Adhesive 600 can be the same type of material as adhesive 200; however, this is not required. The thickness of adhesive layers 200 and 600 can be the same or different. As illustrated in FIG. 6, the adhesive 600 is positioned between the bottom surface 504 of the strip of connection material 500 and the top surface 40 of the roof system. The top surface 502 of the strip of connection material 500 includes a plurality of upstanding stems 506 that have a generally mushroom head shape 508 on the top of each of the stems. The type and configuration of strips 300 and 500 are generally the same so that the mushroom head shapes 308, 508 will properly interengage with one another; however, this is not required. As also illustrated in FIG. 6, an air space A is formed between the flexible solar panel 400 and the top surface 40 of the roof system. The air space A has the potential advantage of 1) allowing for heat dissipation between the solar panel and roof system so as to reduce the incidence of heat damage to the solar panels, and/or the roof system, 2) allowing for drainage of liquid and/or aeration of liquid that may flow or settle between the solar panel and roof system so as to reduce liquid build-up between the solar panel and the roof system that could cause damage to the solar panel and/or the roof system, and/or could result in the formation of mold and/or mildew between the solar panel and the roof system.

Figure 7:
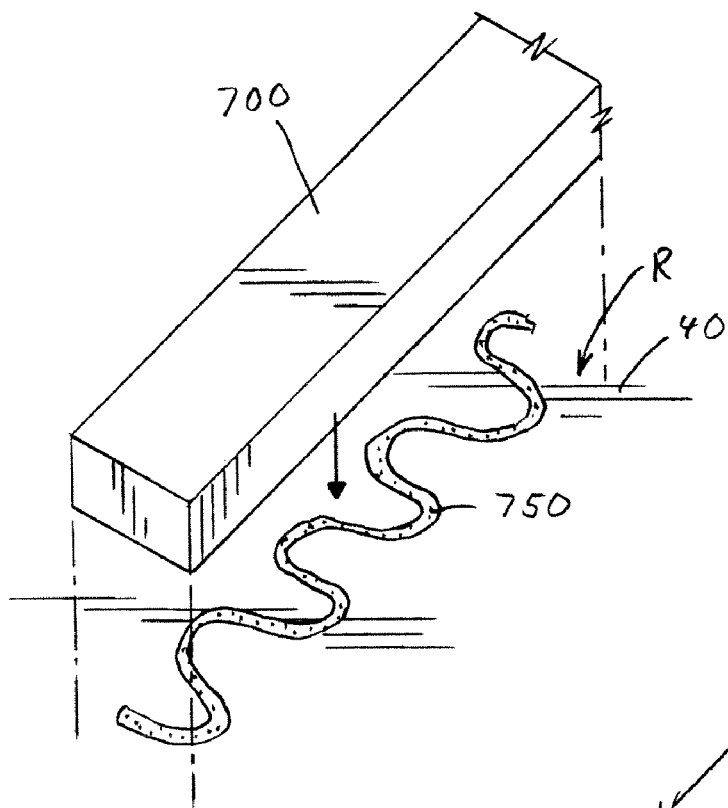
FIG. 7 illustrates an adhesive material that is used to connect a strip of foundation strip or adhesion platform to a top surface of a roof and/or siding system.

Referring now to FIG. 7, there is illustrated a foundation strip or adhesion platform 700 that can be used to enhance or improve the connection of a strip of connection material to the solar panel and/or the roof system. The use of the adhesion platform 700 is an optional feature of the invention. The size, shape, thickness and composition of the adhesion platform is non-limiting. As illustrated in FIG. 7, the adhesion platform has a generally rectangular cross-section shape; however, this is not required. The thickness of the adhesion platform along the longitudinal length is illustrated as generally constant; however, this is not required. The type of adhesive/bonding material 750 used to connect the foundation strip or adhesion platform 700 to the top surface of the roof system is also non-limiting. As illustrated in FIG. 7, the adhesive/bonding material is illustrated as being first placed on the roofing system R prior to connecting the foundation strip or adhesion platform 700 to the roofing system. As can be appreciated, the adhesive/bonding material can be first placed on the bottom of the foundation strip or adhesion platform 700 prior to connecting the foundation strip or adhesion platform 700 to the roofing system R. As can also be appreciated, the adhesive/bonding material can be first placed on the bottom of the foundation strip or adhesion platform 700 and on the roofing system prior to connecting the foundation strip or adhesion platform 700 to the roofing system R. Furthermore, it can be appreciated that the bottom surface of the foundation strip or adhesion platform 700 can include a pre-applied adhesive/bonding material backing during the manufacture of the foundation strip or adhesion platform 700. Adhesive/bonding material 750 is illustrated as being in a liquid form that is applied to the surface of the roofing system, however, it can be appreciated that the adhesive/bonding material could be an adhesive strip.

Figure 8:
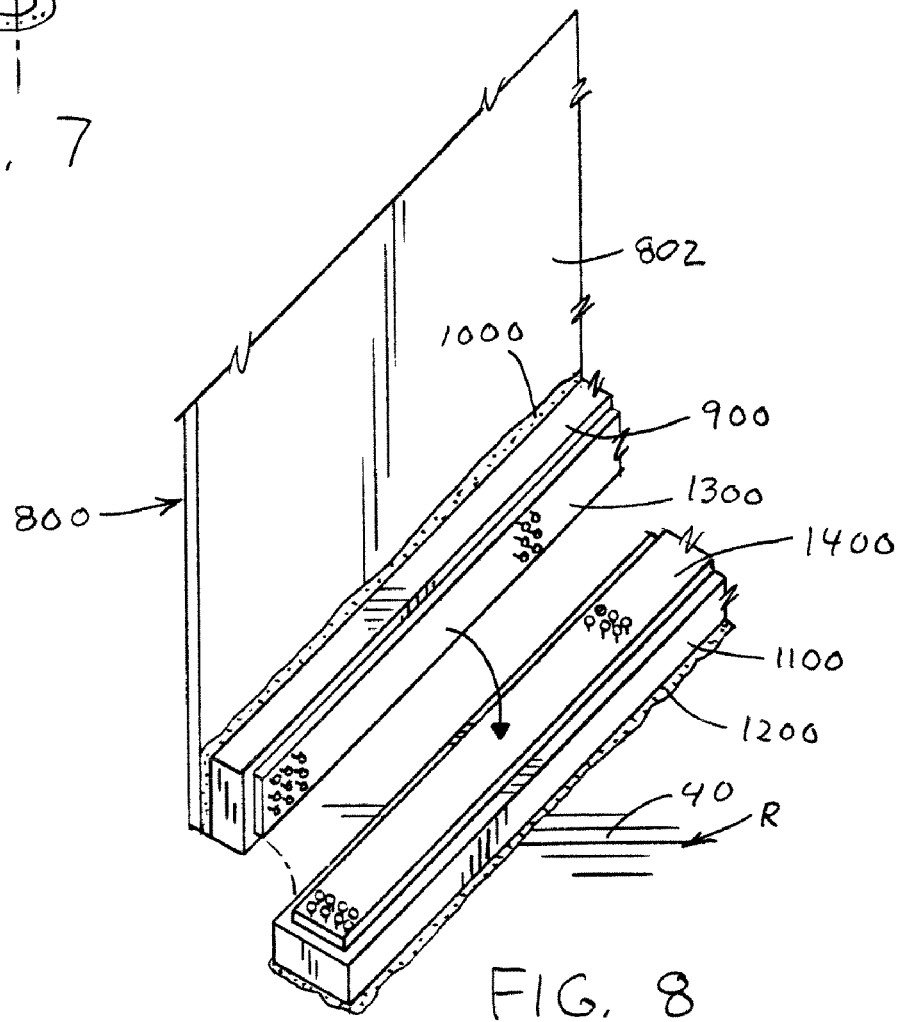
FIG. 8 illustrates a solar panel that is releasably connected to a roof and/or siding system by use of strips of connection material wherein the solar panel includes strips of foundation strip or adhesion platform connected to the bottom surface of the solar panel by an adhesive/bonding material and the top surface of a roof and/or siding system includes strips of foundation strip or adhesion platform connected to the roof and/or siding system by an adhesive/bonding material, and the top surface of the strips of foundation strip or adhesion platform includes strips of connection material.
Figure 21:
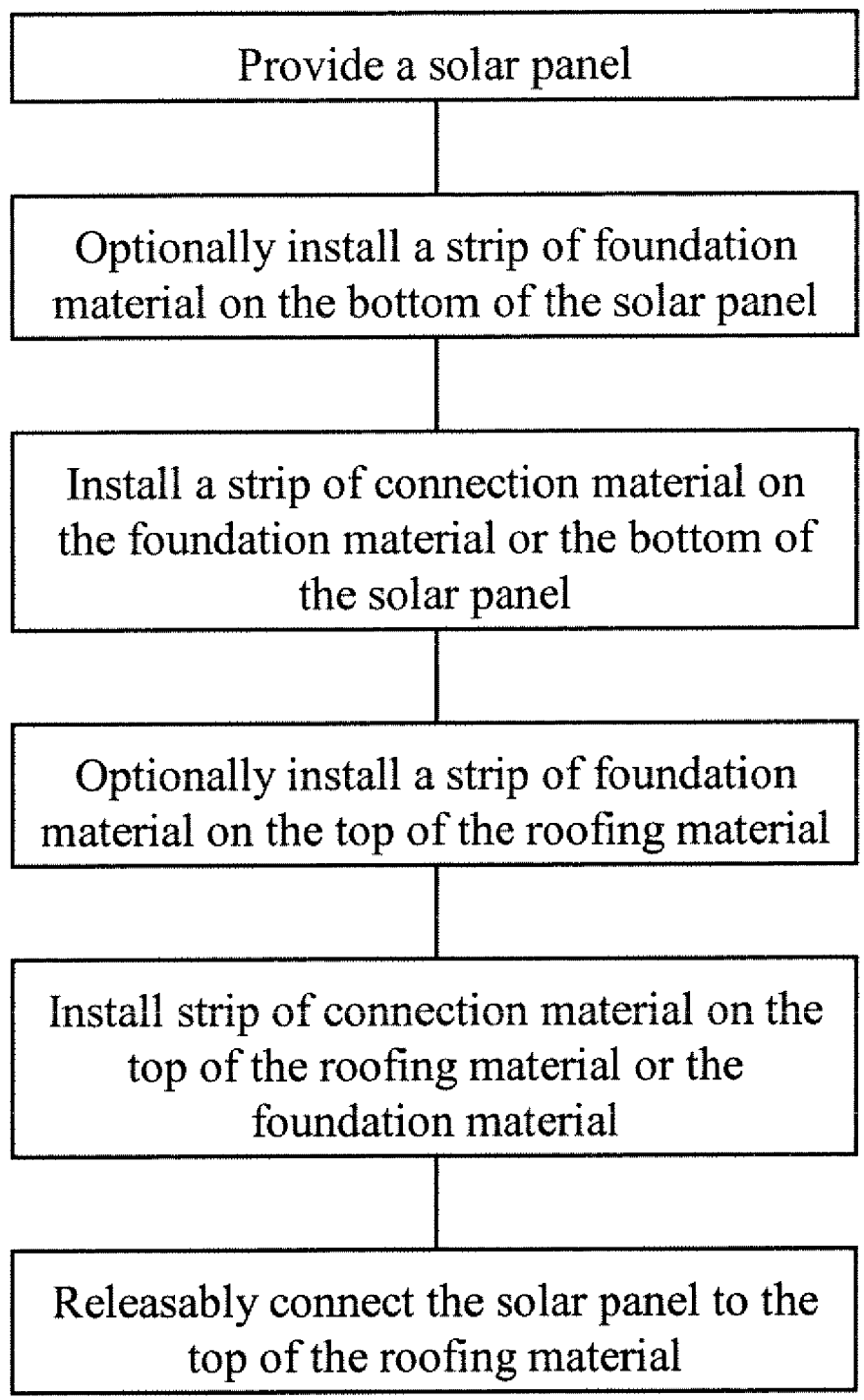
FIGS. 21-25 illustrate several non-limiting methods for connecting a solar panel to a roofing material or for forming a certain type of roofing material.

Referring now to FIG. 8, an adhesion platform 900 is illustrated as being connected to the bottom surface 802 of flexible solar panel 800 and another adhesion platform 1100 is connected to the top surface 40 of the roof system R. As can be appreciated, when the adhesion platform is used, the adhesion platform may be used on both the roof system and the solar panel, or may be only used on the solar panel or the roof system. As illustrated in FIG. 8, an adhesive layer 1000 is used to connect the bottom surface of adhesion platform 900 to the bottom surface 802 of the flexible solar panel 800. An adhesive layer 1200 is illustrated as being used to connect the bottom surface of adhesion platform 1100 to the top surface 40 of the roof system R. The types of materials used for adhesive layers 1000, 1200 can be the same or different. The thickness of the adhesive layers 1000, 1200 can be the same or different. Connected to the top surface of adhesion platform 900 is a strip of connection material 1300 such as, but not limited to, a mushroom-type hook strip system (e.g., 3M Dual Lock, etc.). Likewise, connected to the top surface of adhesion platform 1100 is a strip of connection material 1400 such as, but not limited to, a mushroom-type hook strip system (e.g., 3M Dual Lock, etc.). The strip of connection material can be connected to the adhesion platform in a variety of ways (e.g., adhesive, bitumen coatings, polyurethane coatings, rivet, stitching, staple, nail, screw, etc.). When an adhesive is used, the adhesive can be the same or different as adhesive 750, 1000, 1200 as illustrated in FIGS. 7 and 8. As illustrated in FIG. 8, the width of the adhesion platform is greater than the width of the strip of connection material; however, it can be appreciated that the width of the adhesion platform can be the same or smaller than the width of the strip of connection material. Generally, the ratio of the width of at least one strip of connection material to the width of the adhesion platform along one or more portions of the longitudinal length of the adhesion platform is about 0.05-1.5:1, typically about 0.1-1.2:1, and more typically about 0.2-1:1. As also illustrated in FIG. 8, the thickness of the adhesion platform is greater than the thickness of the strip of connection material; however, it can be appreciated that the thickness of the adhesion platform can be the same or smaller than the thickness of the strip of connection material. As also illustrated in FIG. 8, the length of the adhesion platform is greater than the length of the strip of connection material; however, the length of the adhesion platform can be the same or less than the length of the strip of connection material. FIG. 21 illustrates a non-limiting method for releasably securing a flexible or non-flexible solar panel to the top surface of the roofing material.

Figure 11:
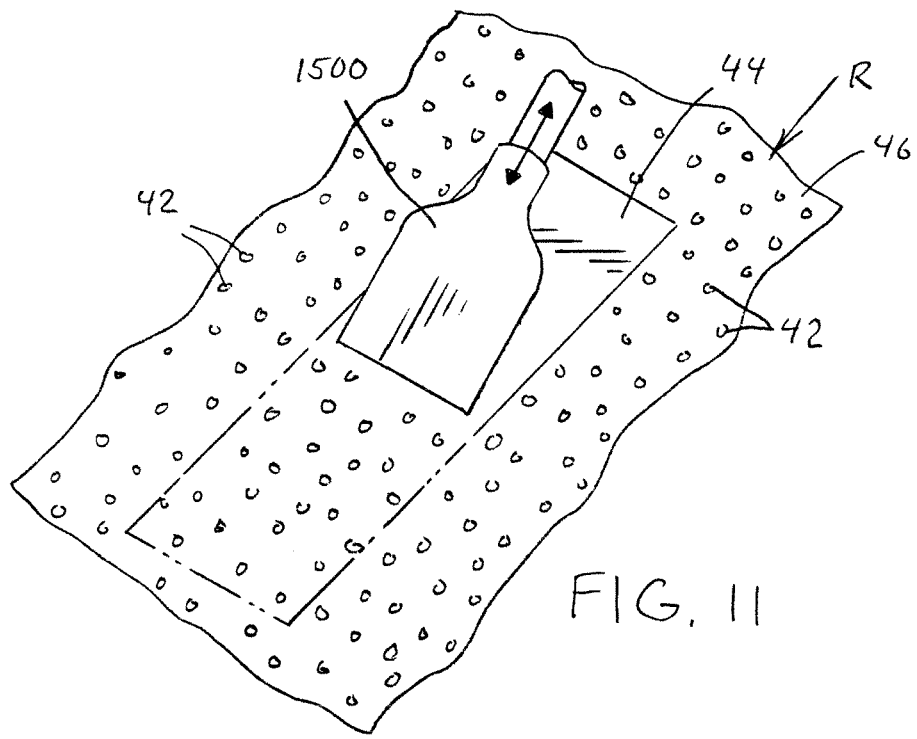
FIG. 11 illustrates a method of preparing a pre-existing roofing and/or siding surface by scrapping granules from a portion of the top surface of the roof and/or siding system prior to connecting strips of connection material and/or strips of foundation strip or adhesion platform to the scrapped region of the roof and/or siding system.

Referring now to FIG. 11, there is illustrated a non-limiting method for preparing a roof surface of a roof system for connection to an adhesion platform or a strip of connection material. Roof system R is illustrated as being a granulated surface system that includes granules 42 on the top surface of the roof system. As can be appreciated, roof system R could instead be a pre-manufactured roofing material that is to be applied to a roof system. As illustrated in FIG. 11, a granule removal tool 1500 such as, but not limited to, a spade or like tool is used to remove granules 42 and/or any other type of texture material from a portion of the top surface of the roof system. This clean portion 44 includes fewer or no granules and/or other type of texture material after the cleaning process is completed. The clean portion can be used to enhance the connection between the top surface of the roof system and the adhesion platform or the strip of connection material. Loose granules and/or texture material on the top surface of the roof surface can sometimes compromise and weaken the connection strength between the roof system and the adhesion platform or the strip of connection material. The removal of some or all of the granules and/or texture material on a portion of the top surface of the roof system prior to connecting the adhesion platform or the strip of connection material to the roof system can be used to overcome or minimize this potential problem.

Figure 12:
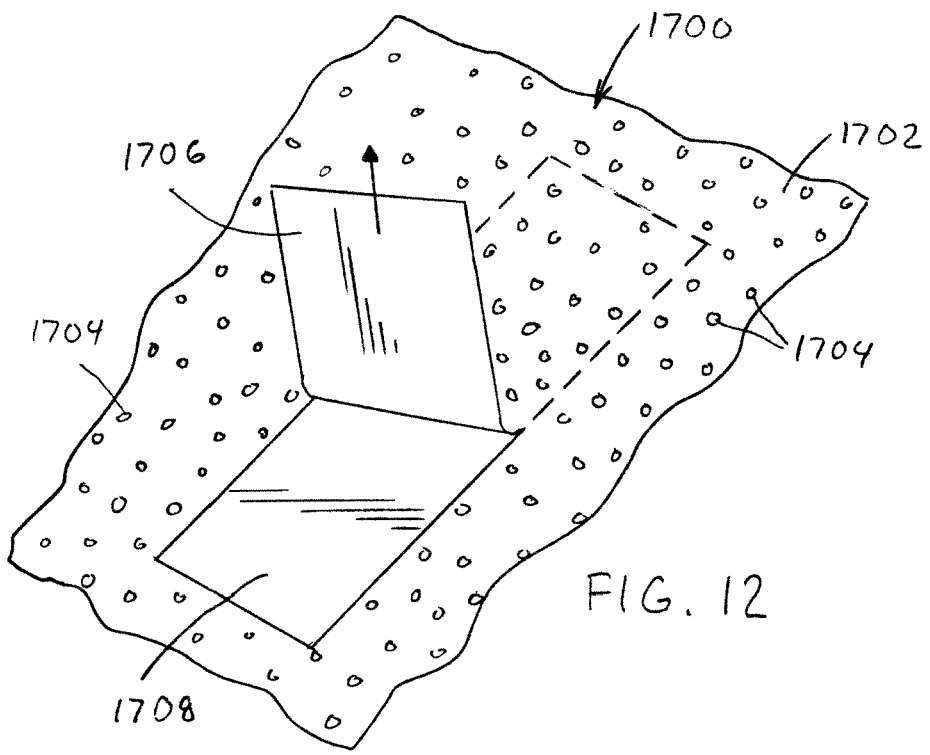
FIG. 12 illustrates pre-manufactured roofing and/or siding material that includes a removable strip that is used to expose a non-granulated region of the roofing and/or siding material so that strips of connection material and/or strips of foundation strip or adhesion platform can be connected to the non-granulated region of the roofing and/or siding material.
Figure 22:
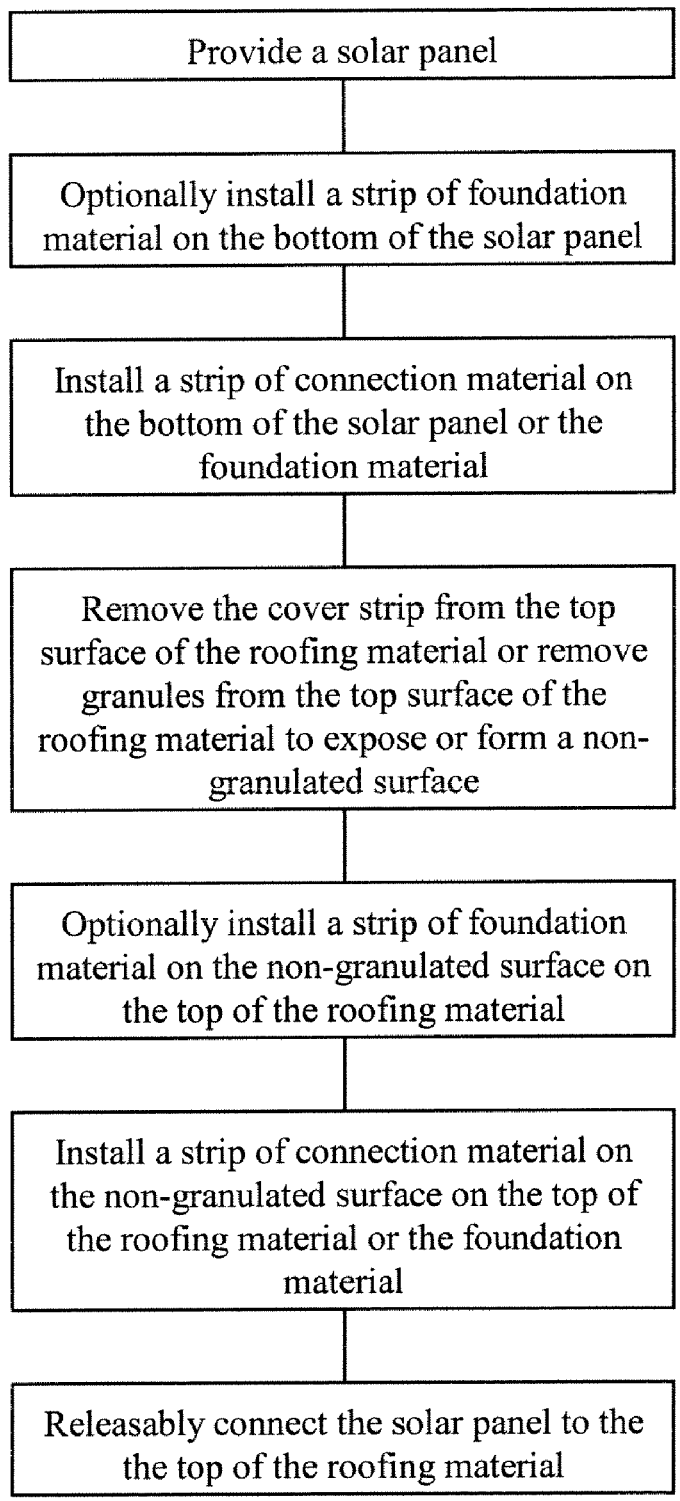
Figure 23:
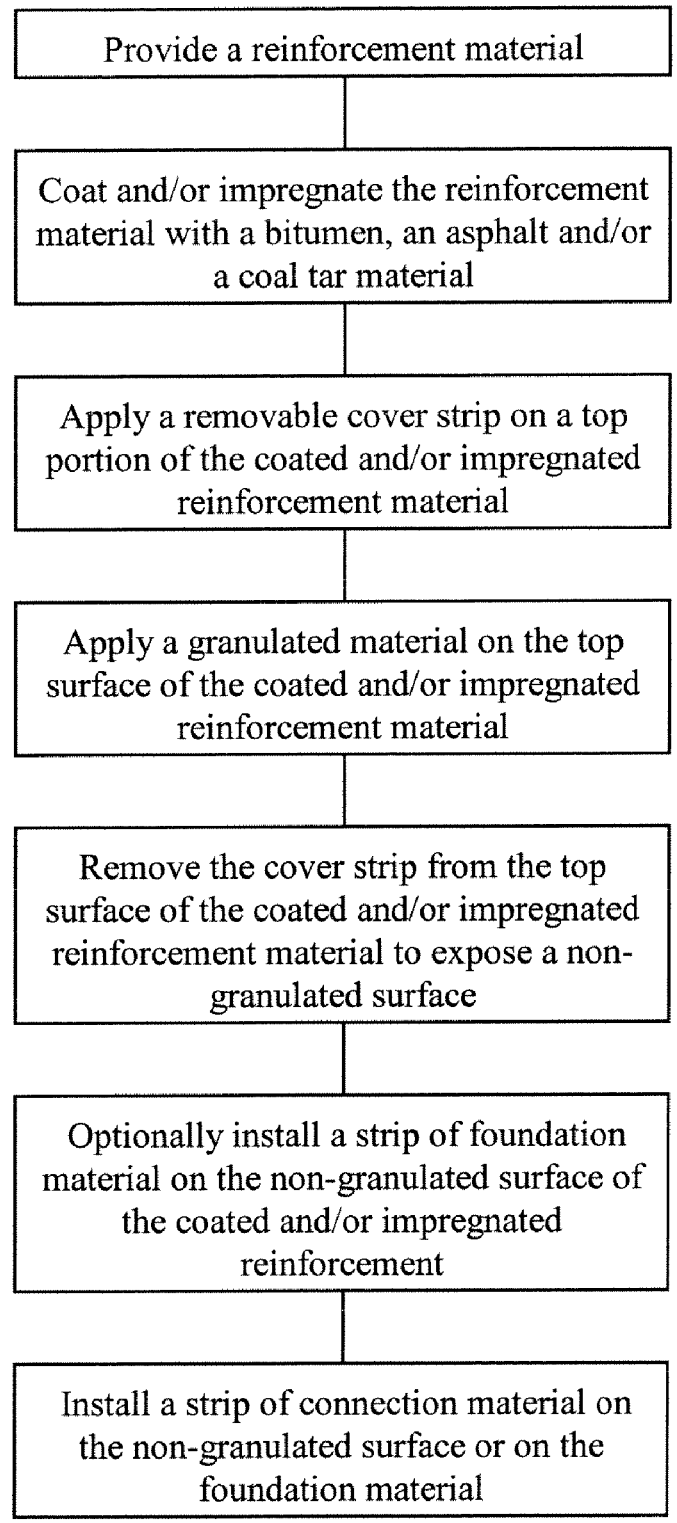

Referring now to FIG. 12, there is illustrated a pre-manufactured roof material 1700 that includes a top surface 1702 that includes granules 1704 and/or some other type of texture material. The roofing material can be any type of roofing material (e.g., single ply, MB, BUR, asphalt shingled system, metal roofing system, etc.) that includes granules and/or some other type of texture material on the top surface of the roofing material. During the manufacturing process of the roofing material, a removable strip 1706 is applied to a portion of the top surface 1702 of the roofing material prior to the granules 1704 and/or other type of texture material being applied to the top surface of the roofing material. The material used to form the removable strip is non-limiting. Typically, the removable strip is a flexible material (e.g., plastic, paper, polymeric material, etc.); however, this is not required. The manner in which the removable strip is applied to the top surface of the roofing material or is able to be removed from the top surface of the roofing material is non-limiting. Furthermore, the length and width of the removable strip is non-limiting. Also, the location of the removable strip on the top surface of the roofing material is non-limiting. After the roofing material is formed, the removable strip 1706 can be removed to expose a clean portion 1708 that is essentially granule free and/or texture free on the top surface of the roofing material. FIG. 22 illustrates a non-limiting method for securing a flexible or non-flexible solar panel to a non-granulated region on the top surface of a roofing material. FIG. 232 illustrates a non-limiting method for manufacturing a roofing material that includes a removable cover strip that can be used to expose a non-granulated region on the top surface of the roofing material.

Figure 13:
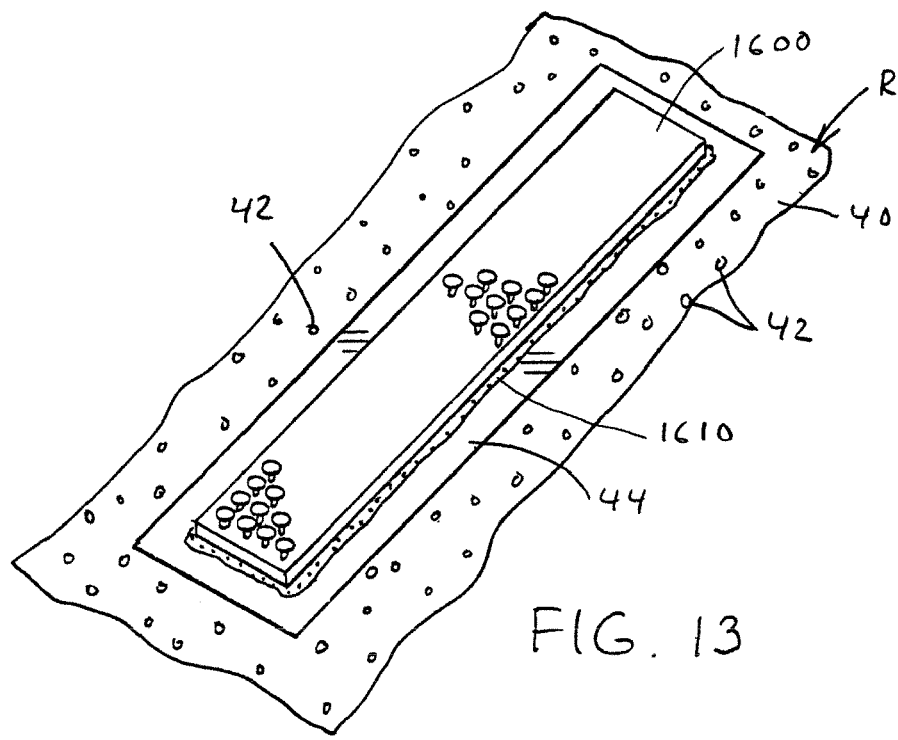
FIG. 13 illustrates a roofing and/or siding material that includes a non-granulated region and wherein a strip of connection material is connected to the non-granulated region of the roofing and/or siding material.

Referring now to FIG. 13, there is illustrated a strip of connection material 1600 such as, but not limited to, a mushroom-type hook strip system (e.g., 3M Dual Lock, etc.) that is connected to the clean portion 44 of the roof system R or clean portion 1708 of pre-manufactured roof material 1700. The manner in which the strip of connection material 1600 is connected to the clean portion 44, 1708 of the roof system R or pre-manufactured roof material 1700 is non-limiting. As illustrated in FIG. 13, an adhesive 1610 is used to secure the strip of connection material 1600 to the clean portion 44, 1708 of the roof system R or pre-manufactured roof material 1700. The type and/or form (e.g., liquid, adhesive strip, etc.) of the adhesive is non-limiting.

Figure 14:
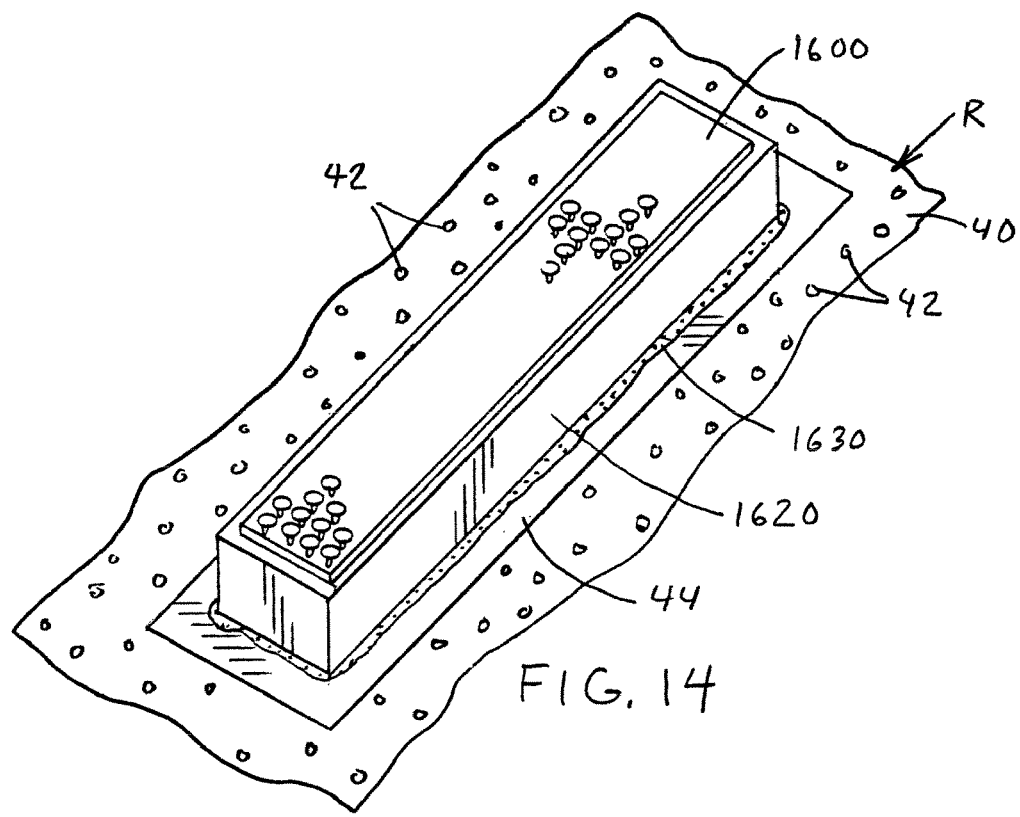
FIG. 14 illustrates a roofing and/or siding material that includes a non-granulated region and wherein a strip of foundation material is connected to the non-granulated region of the roofing and/or siding material and wherein the top surface of the strip of foundation material includes a strip of connection material.

Referring now to FIG. 14, a strip of adhesion platform 1620 is connected to the clean portion 44 of the roof system R or clean portion 1708 of pre-manufactured roof material 1700. The manner in which the strip of adhesion platform 1620 is connected to the clean portion 44, 1708 of the roof system R or pre-manufactured roof material 1700 is non-limiting. As illustrated in FIG. 13, an adhesive 1630 is used to secure the strip of connection material 1600 to the clean portion 44, 1708 of the roof system R or pre-manufactured roof material 1700. The type and/or form (e.g., liquid, adhesive strip, etc.) of the adhesive is non-limiting.

As indicated above, the length and width of the clean portion on the roof system R is non-limiting. Also, the location of the clean portion on the top surface of the roofing material is non-limiting. As illustrated in FIGS. 13 and 14, the length and width of the clean portion is greater than the length and width of the strip of connection material and strip of adhesion platform or foundation strip; however, it can be appreciated, that the length and/or width of the clean portion can be equal to or smaller than the length and/or width of the strip of connection material and/or adhesion platform or foundation strip.

Figure 15:
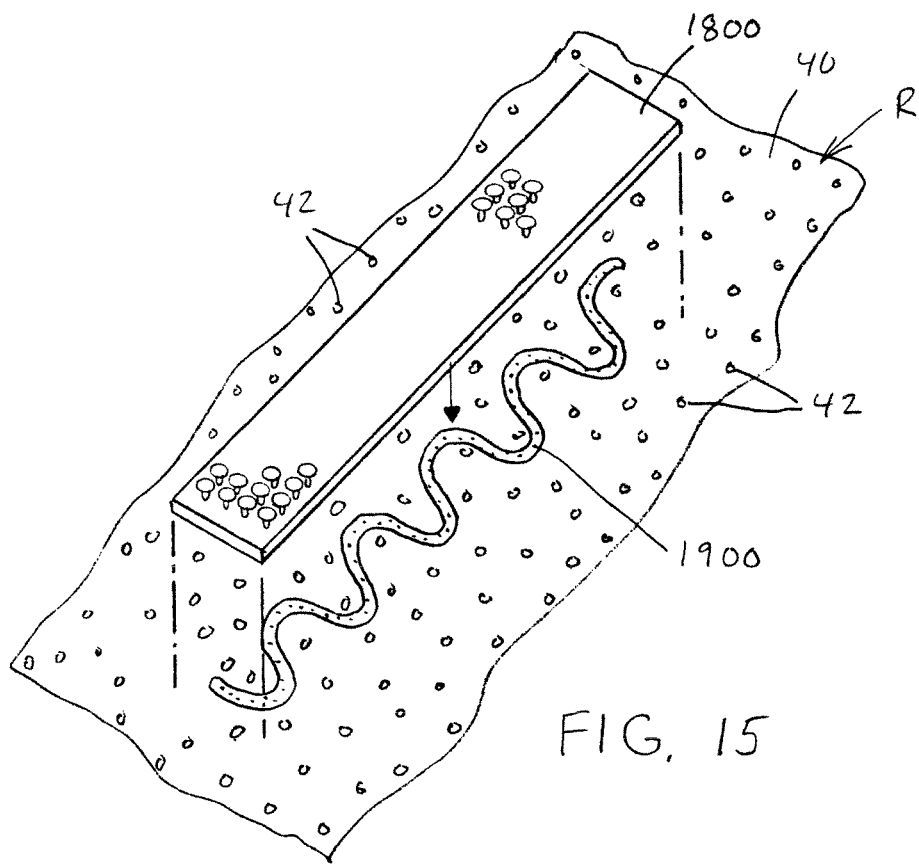
FIGS. 15 and 16 illustrate an adhesive/bonding material that is used to connect a strip of connection material to a top surface of a granulated roof and/or siding system.
Figure 16:
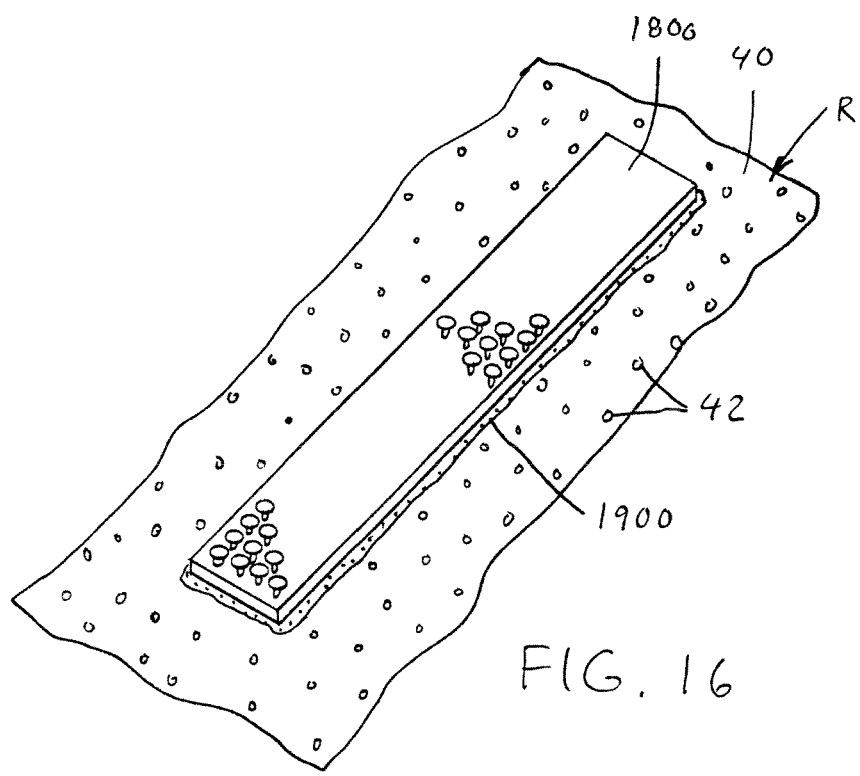

Referring now to FIG. 15, there is illustrated a roofing system R that includes a top surface 40 that has a plurality of granules 42 and/or other type of texture material on the top surface. A strip of connection material 1800 is designed to be connected to the top surface of the roofing system by an adhesive 1900. In this embodiment of the invention, the granules and/or other type of texture material are not removed prior to the strip of connection material being connected to the top surface of the roof system. Referring now to FIG. 16, there is illustrated a roofing system R that includes a top surface 40 that has a plurality of granules 42 and/or other type of texture material on the top surface. Strip of connection material 1800 is connected by adhesive 1900 to the top surface of the roofing system. The granules and/or other type of texture material are not removed prior to the adhesion platform be connected to the top surface of the roof system. The type and/or form (e.g., liquid, adhesive strip, etc.) of the adhesive 1900 is non-limiting. Generally, the adhesive is a liquid adhesive (e.g., polyurethane based adhesive, bitumen based adhesive, polyurethane and bitumen based adhesive, methacrylate adhesive, etc.) as illustrated in FIG. 15; however, this is not required.

Figure 17:
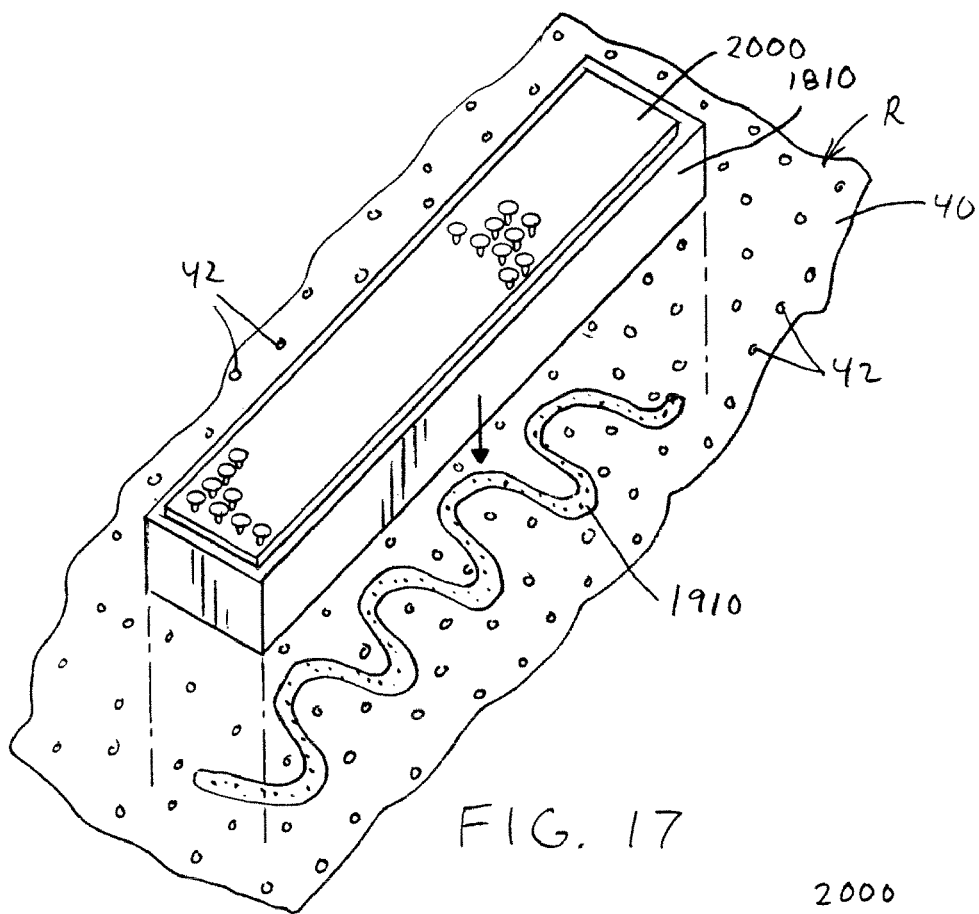
FIGS. 17 and 18 illustrate an adhesive/bonding material that is used to connect a strip of foundation material or adhesion platform to a top surface of a granulated roof and/or siding system, and wherein the top surface of the strip of foundation material or adhesion platform includes a strip of connection material.
Figure 18:
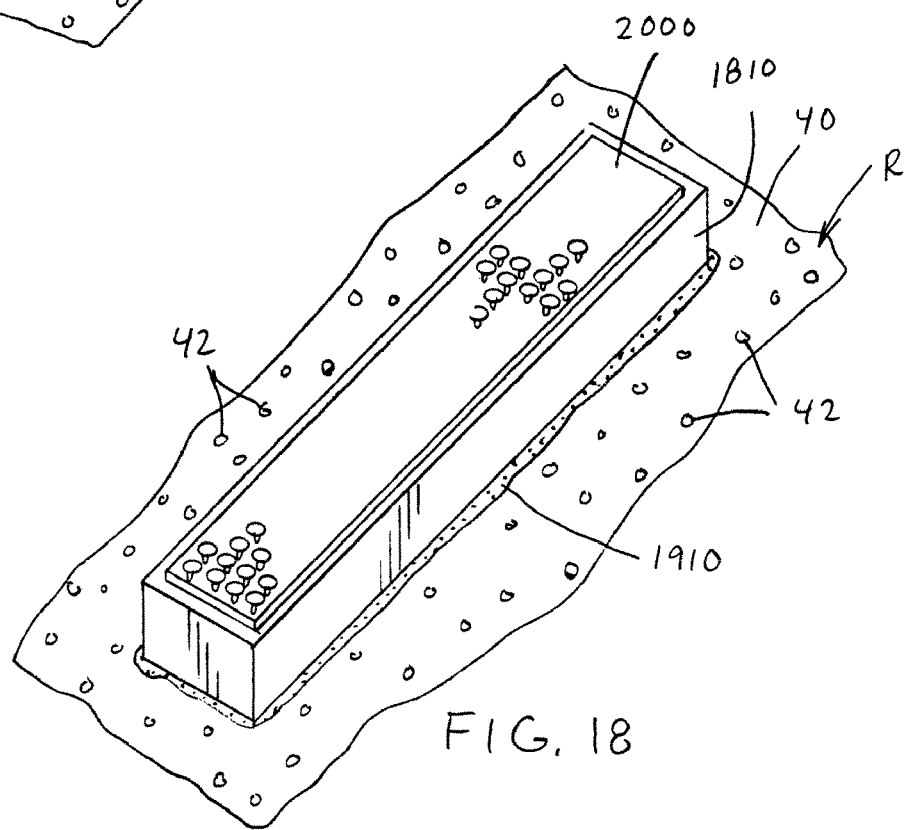

Referring now to FIG. 17, there is illustrated a roofing system R that includes a top surface 40 that has a plurality of granules 42 and/or other type of texture material on the top surface. A strip of adhesion platform or foundation strip 1810 is designed to be connected to the top surface of the roofing system by an adhesive 1910. In this embodiment of the invention, the granules and/or other type of texture material are not removed prior to the strip of connection material being connected to the top surface of the roof system. A strip of connection material 2000 such as, but not limited to, a mushroom-type hook strip system (e.g., 3M Dual Lock, etc.), can be connected to the top surface of the strip of adhesion platform or foundation strip. Referring now to FIG. 18, there is illustrated a roofing system R that includes a top surface 40 that has a plurality of granules 42 and/or other type of texture material on the top surface. The adhesion platform or foundation strip 1810 is connected by adhesive 1910 to the top surface of the roofing system R. The granules and/or other type of texture material are not removed prior to the adhesion platform connected to the top surface of the roof system. Connected to the top surface of the adhesion platform 1810 is a strip of connection material 2000 such as, but not limited to, a mushroom-type hook strip system (e.g., 3M Dual Lock, etc.). The length, thickness and width of the adhesion platform is illustrated as being greater than the length, thickness and width of the strip of connection material; however, it can be appreciated that the length, thickness and/or width of the adhesion platform can be equal to or less than the length, thickness and/or width of the strip of connection material. The strip of connection material can be connected to the top surface of the adhesion platform by any number of ways. The type and/or form (e.g., liquid, adhesive strip, etc.) of the adhesive 1900 is non-limiting. Generally the adhesive is a liquid adhesive (e.g., polyurethane based adhesive, bitumen based adhesive, polyurethane and bitumen based adhesive, methacrylate adhesive, etc.) as illustrated in FIG. 17; however, this is not required.

Figure 19:
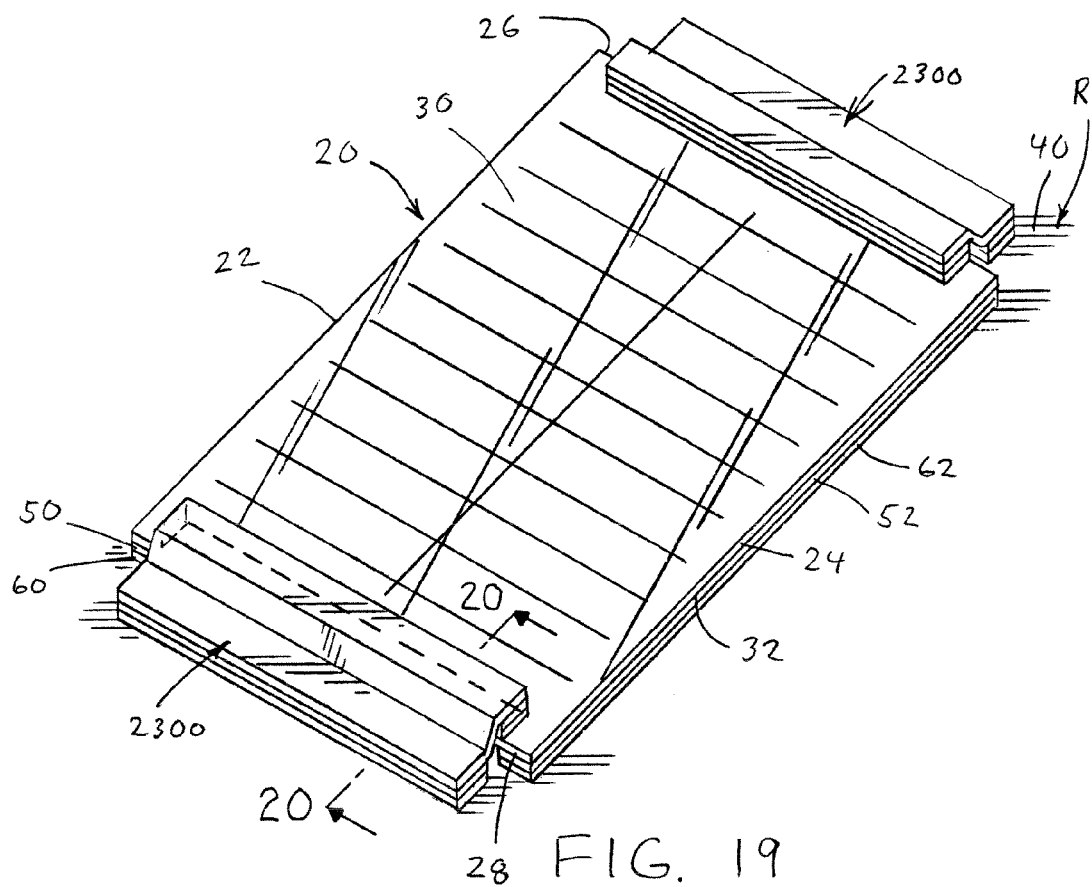
FIG. 19 illustrates an end strip that is connected to an end of a solar panel and to the top surface of a roof system that includes a strip of connection material.
Figure 20:
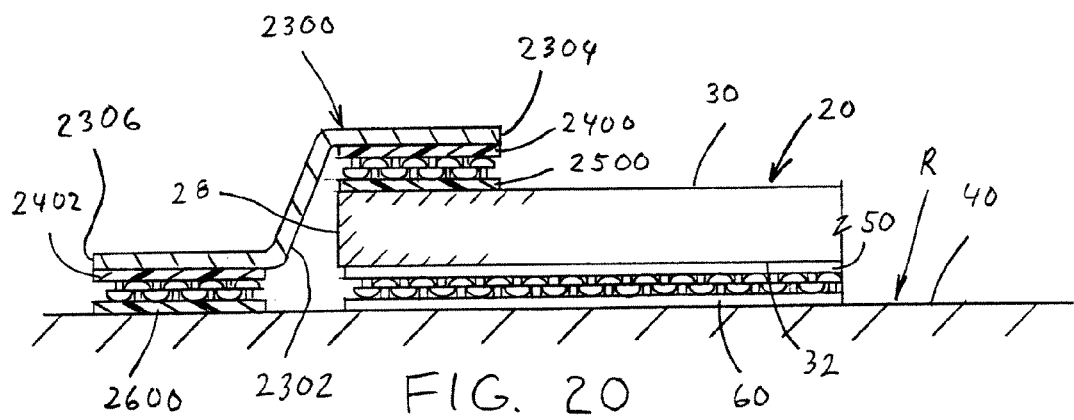
FIG. 20 is a cross-section view along line 20-20 of FIG. 19.

Referring now to FIGS. 19 and 20, there is illustrated a non-limiting embodiment to secure the ends of a solar panel to a roof system. FIG. 19 illustrates a flexible solar panel that is connected to a roof system in a manner similar to the solar panel illustrated in FIG. 1, thus similar numbering will be used. As illustrated in FIG. 19, flexible solar panel 20 has a generally rectangular shape and has two longitudinal side edges 22, 24 and two end edges 26, 28. The flexible solar panel also has a top surface 30 and a bottom surface 32. Two strips of connection material 50, 52 are illustrated as being connected to the bottom surface 32 of the flexible solar panel and at or adjacent to the two longitudinal side edges 22, 24 of the flexible solar panel. Also, two strips of connection material 60, 62 are illustrated as being connected to the top surface 40 of roof system R. The strips of connection material 50, 52 are illustrated as being generally aligned with the two longitudinal side edges 22, 24 of the flexible solar panel along the longitudinal length of the flexible solar panel. As also illustrated in FIG. 19, the strips of connection material 50, 52 are illustrated as terminating at the two end edges 26, 28 of the solar panel. As best illustrated in FIG. 20, the two end edges 26, 28 of the solar panel are held down on the roof system by the use of an end strip 2300. The bottom surface 2302 of the end strip includes two strips of connection material 2400, 2402 such as, but not limited to, a mushroom-type hook strip system (e.g., 3M Dual Lock, etc.), a hook and loop strip system (e.g., Velcro, etc.), etc. The two strips of connection material 2400, 2402 are illustrated as running along the edges 2304, 2306 of the end strip. As can be appreciated, the configuration of the one or more strips of connection material on the bottom surface of the end strip is non-limiting. The top surface 30 of the solar panel includes a strip of connection material 2500 such as, but not limited to, a mushroom-type hook strip system (e.g., 3M Dual Lock, etc.), a hook and loop strip system (e.g., Velcro, etc.), etc. Also the top surface 40 of the roof system R includes a strip of connection material 2600 such as, but not limited to, a mushroom-type hook strip system (e.g., 3M Dual Lock, etc.), a hook and loop strip system (e.g., Velcro, etc.), etc. Strips of connection material 2500, 2600 can be connected to the solar panel and roof system in a variety of ways. As illustrated in FIG. 20, strip 2402 is designed to be releasably connected to strip 2600 and strip 2400 is designed to be releasably connected to strip 2500 so as to secure the two end edges 26, 28 of the solar panel to the roof system. Such a connection has the advantage of inhibiting the uplifting of the ends of the solar panel when exposed to high wind conditions. As can be appreciated, other or additional advantages may exist when using end strip 2300. As can also be appreciated, one or both ends of the solar panel can be secured to the top surface of the roof system in other or additional ways.

Figure 24:
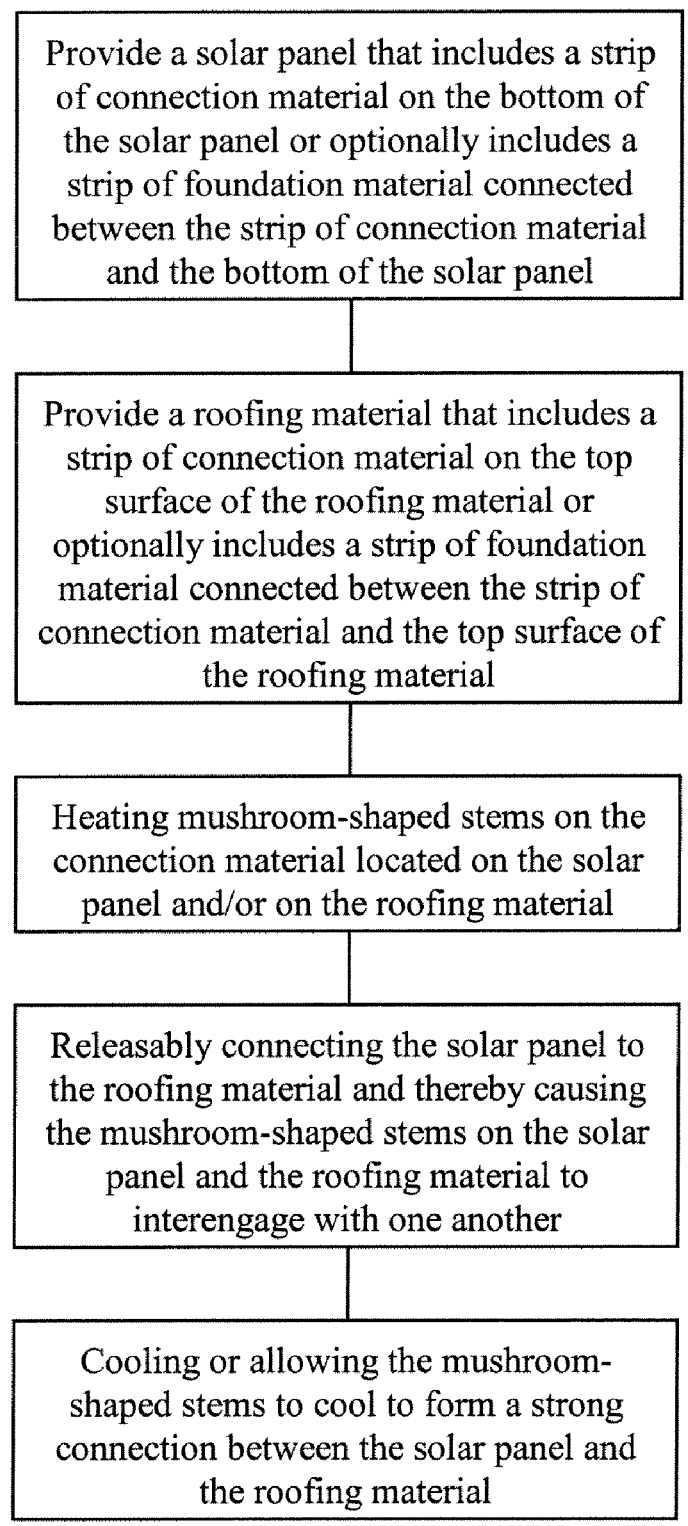
Figure 25:
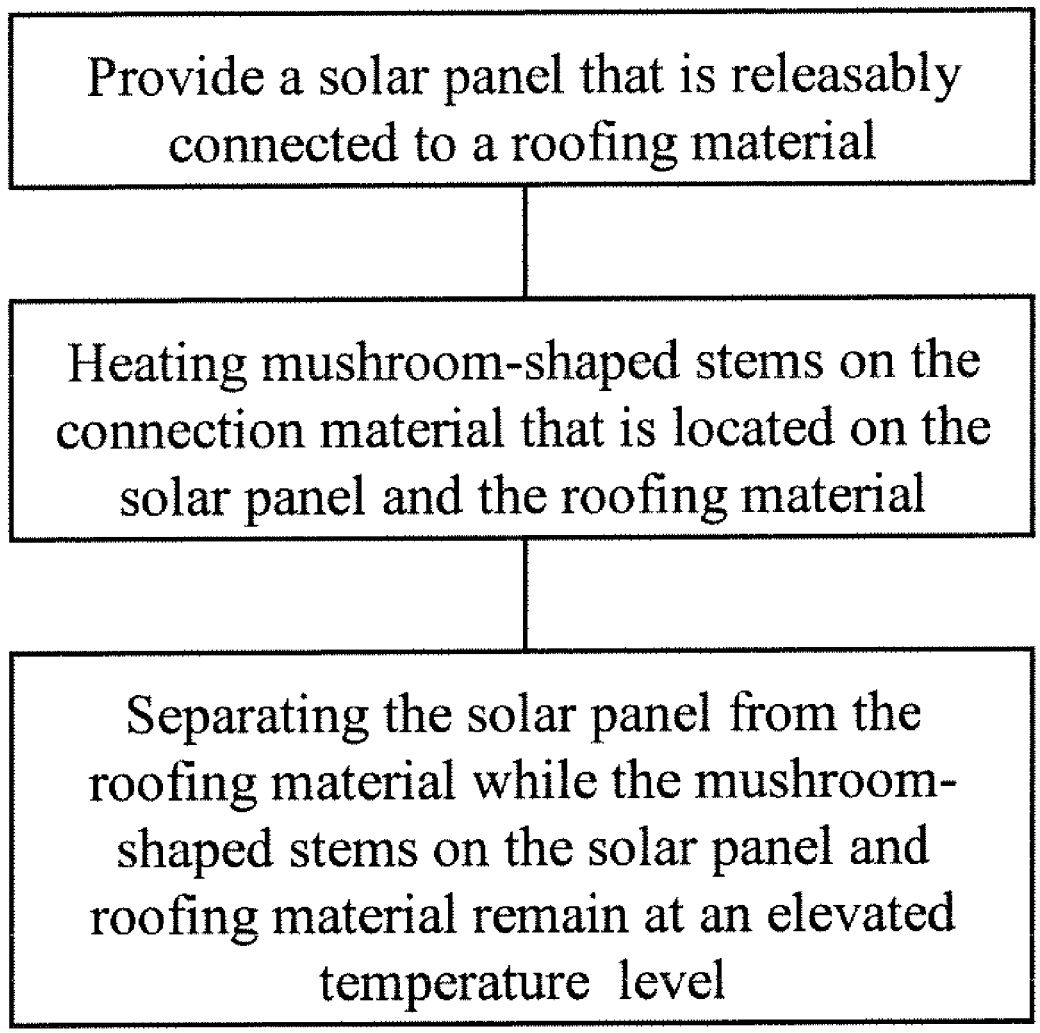

Referring now to FIGS. 24 and 25, there is illustrated a non-limiting method for connecting and disconnecting a flexible or non-flexible solar panel from the top surface of a roofing material. In this non-limiting embodiment of the invention, the mushroom-shaped stems on the strips of connection material are formed of a special polymer material can be heated to a certain temperature to cause the mushroom-shaped stems to became more flexible without damaging the mushroom-shaped stems. This increased flexibility of the mushroom-shaped stems enables the mushroom-shaped stems to easily interengage mushroom-shaped stems on another connection strip that may or may not have also been heated. Once the mushroom-shaped stems on the twp connections trips have interengaged, the heated mushroom-shaped stems are allowed to cool and become more rigid. The increased rigidity of the mushroom-shaped stems results in significantly increased force needed to separate the interengaged mushroom-shaped stems, thus resulting in a strong connection between the solar panel and the roofing material. As illustrated in FIG. 25, the solar panel can be easily removed form the roofing material when the mushroom-shaped stems are reheated. The heating of the mushroom-shaped stems can be accomplished in a number of way (e.g., heated air blown onto the mushroom-shaped stems, heating coils and/or heating irons placed in contact with or adjacent to the mushroom-shaped stems, etc.).

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween.

We claim:

1. A rooting system or siding system having a removably connected solar panel to a surface of said roof system or siding system comprising a roofing or siding material having an upper surface, a solar panel having an upper and lower surface, a first strip of material connected to said lower surface of said solar panel, a second strip of material connected to said upper surface of said roof or siding material, said first and second strips of material having a top and bottom surface, said bottom surface of first strip connected to said lower surface of said solar panel, said bottom surface of said second strip connected to said upper surface of said roof or siding material, said top surface of said first and second strips including a plurality of stems having mushroom shaped heads extending upwardly from said top surface, said plurality of stems having mushroom shaped heads on said top surface of said first and second strips designed to releasably mate with one another when said strips are pressed together and thereby form a connection between said strips that has sufficient strength to secure said solar panel said upper surface of said roof or siding material, said first strip, said second strip, or combinations thereof includes an adhesion platform.

2. The roofing system or siding system as defined in claim 1, wherein said solar panel is a flexible solar panel.

3. The rooting system or siding system as defined in claim 1, wherein said first strip is connected to less than a majority of said lower surface of said solar panel.

4. The roofing system or siding system as defined in claim 1, wherein said lower surface of said solar panel includes a plurality of said first strips.

5. The roofing system or siding system as defined in claim 1, wherein said upper surface of said roof or siding material includes a plurality of said second strips.

6. The roofing system or siding system as defined in claim 1, wherein a force to separate said first and second strips after said first and second strips are connected together is at least about 1 pounds per linear inch.

7. The roofing system or siding system as defined in claim 1, including at least one end strip that is a) removably connected to an edge of said solar panel, b) removably connected to said upper surface of said roof system or siding system, or combinations thereof, said end strip designed to facilitate in securing and holding down said edge of said solar panel to said upper surface of said roof system or siding system.

8. A roofing system or siding system having a removably connected solar panel to a surface of said roof system or siding system comprising a roofing or siding material having an upper surface, a solar panel having an upper and lower surface, a first strip of material connected to said lower surface of said solar panel, a second strip of material connected to said upper surface of said roof or siding material, said first and second strips of material having a top and bottom surface, said bottom surface of first strip connected to said lower surface of said solar panel, said bottom surface of said second strip connected to said upper surface of said roof or siding material, said first strip, said second strip, or combinations thereof includes a layer of adhesion platform connected to said lower surface of said solar panel, said upper surface of said roofing or siding material, said first strip, said second strip, or combinations thereof includes a layer connecting material, said connecting material including a plurality of stems having mushroom shaped heads extending upwardly from said top surface of said first and second strips, said plurality of stems having mushroom shaped heads on said top surface of said first and second strips designed to releasably mate with one another when said strips are pressed together and thereby form a connection between said strips that has sufficient strength to secure said solar panel said upper surface of said roof or siding material, a force to separate said first and second strips after said first and second strips are connected together is at least about 1 pounds per linear inch.

9. The roofing system or siding system as defined in claim 8, wherein said lower surface of said solar panel having a polygonal shape, said lower surface of said solar panel includes a plurality of said first strips positioned at or closely adjacent to a majority of a peripheral edge of said solar panel, said upper surface of said roof or siding material including a plurality of said second strips.

10. The roofing system siding system as defined in claim 8, including at least one end strip that is a) removably connected to an edge of said solar panel, b) removably connected to said upper surface of said roof system or siding system, or combinations thereof, said end strip designed to facilitate in securing and holding down said edge of said solar panel to said upper surface of said roof system or siding system.

11. A method for releasably connecting a solar panel to a roof system or siding system comprising:
   a. providing a solar panel that has an upper and lower surface, said upper surface designed to receive solar radiation for conversion into energy;
   b. providing a roofing or siding material that has a top and bottom surface;
   c. providing a connector arrangement, said connector arrangement including first and second strips, said first and second strips having a top and bottom surface, said top surface of said first and second strips including a plurality of stems having mushroom shaped heads extending upwardly from said top surface, said plurality of stems having mushroom shaped heads on said first strip designed to releasably mate with said plurality of stems having mushroom shaped heads on said second strip, said first strip, said second strip, or combinations thereof includes an adhesion platform;
   d. securing said bottom surface of said roofing or siding material to a building structure;
   e. connecting said bottom surface of first strip to said lower surface of said solar panel;
   f. connecting said bottom surface of said second strip to said upper surface of said roofing or siding material; and,
   g. moving said solar panel to ward said upper surface of said roofing or siding material to thereby cause said plurality of stems having mushroom shaped heads on said first and second strips to releasably mate with one another and to thereby form a connection between said strips that has sufficient strength to secure said solar panel said roofing or siding material.

12. The method as defined in claim 11, wherein said solar panel is a flexible solar panel.

13. The method as defined in claim 11, wherein said first strip is connected to less than a majority of said lower surface of said solar panel.

14. The method as defined in claim 11, wherein said lower surface of said solar panel includes a plurality of said first strips.

15. The method as defined in claim 11, wherein said upper surface of said roofing or siding material includes a plurality of said second strips.

16. The method as defined in claim 11, wherein a force to separate said first and second strips after said first and second strips are connected together is at least about 1 pounds per linear inch.

17. The method as defined in claim 11, including the step of providing at least one end strip that is a) removably connected to an edge of said solar panel, b) removably connected to said upper surface of said roof system or siding system, or combinations thereof, and further including the step of securing said end strip to said solar panel and said roof system or siding system to facilitate in securing and holding down said edge of said solar panel to said upper surface of said roof system or siding system.

18. A method for releasably connecting a solar panel to a roof system or siding system comprising:
   a. providing solar panel that has an upper and lower surface, said upper surface designed to receive solar radiation for conversion into energy;
   b. providing a roofing or siding material that has a top and bottom surface;
   c. providing a connector arrangement, said connector arrangement including first and second strips, said first and second strips having a top and bottom surface, said top surface of said first and second strips including a plurality of stems having mushroom shaped heads extending upwardly from said top surface, said plurality of stems having mushroom shaped heads on said first strip designed to releasably mate with said plurality of stems having mushroom shaped heads on said second strip;
d. securing said bottom surface of said roofing or siding material to a building structure;
e. connecting said bottom surface of first strip to said lower surface of said solar panel;
f. cleaning or modifying said upper surface of said roofing or siding material to remove granules or texture material from only a portion of said upper surface of said roofing or siding material prior to connecting said second strip to said upper surface of said roofing or siding material
g. connecting said bottom surface of said second strip to said upper surface of said roofing or siding material; and,
h. moving said solar panel to ward said upper surface of said roofing or siding material to thereby cause said plurality of stems having mushroom shaped heads on said first and second strips to releasably mate with one another and to thereby form a connection between said strips that has sufficient strength to secure said solar panel said roofing or siding material.

19. The method as defined in claim 18, wherein said step of cleaning includes removing a removable pre-applied cover from said top surface of said roofing or siding material, said removable pre-applied cover applied to said roofing or siding material while said roofing or siding material was being manufactured.

20. The method as defined in claim 18, wherein said step of cleaning includes scraping granules from said top surface of said roofing or siding material.

* * * * *